(12) United States Patent  (10) Patent No.: US 8,250,131 B1
Pulsipher  (45) Date of Patent: Aug. 21, 2012

(54) METHOD AND APPARATUS FOR MANAGING A DISTRIBUTED COMPUTING ENVIRONMENT

(75) Inventor: Darren W. Pulsipher, Alpine, UT (US)

(73) Assignee: Cadence Design Systems, Inc., San Jose, CA (US)

( * ) Notice: Subject to any disclaimer, the term of this patent is extended or adjusted under 35 U.S.C. 154(b) by 990 days.

(21) Appl. No.: 11/297,720

(22) Filed: Dec. 8, 2005

Related U.S. Application Data

(60) Provisional application No. 60/634,718, filed on Dec. 8, 2004, provisional application No. 60/634,628, filed on Dec. 8, 2004, provisional application No. 60/634,719, filed on Dec. 8, 2004, provisional application No. 60/634,687, filed on Dec. 8, 2004, provisional application No. 60/634,720, filed on Dec. 8, 2004, provisional application No. 60/634,481, filed on Dec. 8, 2004.

(51) Int. Cl.
*G06F 15/16* (2006.01)
(52) U.S. Cl. .......................... 709/201; 709/225; 718/100
(58) Field of Classification Search .................. 709/201, 709/203, 225, 226; 718/1, 100, 104, 106, 718/107; 719/328
See application file for complete search history.

(56) References Cited

U.S. PATENT DOCUMENTS

| | | | |
|---|---|---|---|
| 4,825,354 A | 4/1989 | Agrawal et al. | |
| 5,319,758 A | 6/1994 | Arai et al. | |
| 5,806,076 A | 9/1998 | Ngai et al. | |
| 5,903,891 A | 5/1999 | Chen et al. | |
| 5,999,911 A | 12/1999 | Berg et al. | |
| 6,006,264 A | 12/1999 | Colby et al. | |
| 6,044,394 A | 3/2000 | Cadden et al. | |
| 6,182,158 B1 | 1/2001 | Kougiouris et al. | |
| 6,247,041 B1 | 6/2001 | Krueger et al. | |
| 6,282,697 B1 | 8/2001 | Fables et al. | |
| 6,321,264 B1 * | 11/2001 | Fletcher et al. | 709/224 |
| 6,418,484 B1 | 7/2002 | Radia | |
| 6,463,527 B1 | 10/2002 | Vishkin | |
| 6,574,628 B1 * | 6/2003 | Kahn et al. | 707/10 |
| 6,601,057 B1 | 7/2003 | Underwood et al. | |
| 6,606,742 B1 | 8/2003 | Orton et al. | |
| 6,647,408 B1 | 11/2003 | Ricart et al. | |
| 6,651,047 B1 | 11/2003 | Weschler, Jr. | |
| 6,684,261 B1 | 1/2004 | Orton et al. | |
| 6,687,735 B1 | 2/2004 | Logston et al. | |
| 6,704,806 B1 | 3/2004 | Decker | |
| 6,715,145 B1 * | 3/2004 | Bowman-Amuah | 718/101 |
| 6,772,216 B1 | 8/2004 | Ankireddipally et al. | |
| 6,807,572 B1 | 10/2004 | Yu | |
| 6,912,719 B2 | 6/2005 | Elderon et al. | |
| 6,971,096 B1 | 11/2005 | Ankireddipally et al. | |
| 6,981,034 B2 * | 12/2005 | Ding et al. | 709/223 |
| 6,996,829 B2 | 2/2006 | Meyer | |

(Continued)

OTHER PUBLICATIONS

L. Ferriera, et al., "Introduction to Grid Computing With Globus", *IBM Redbooks*, Sep. 2003.

(Continued)

*Primary Examiner* — David Lazaro
*Assistant Examiner* — Marie Georges Henry
(74) *Attorney, Agent, or Firm* — Vista IP Law Group, LLP

(57) ABSTRACT

Method and system for managing a distributed computing environment. The methods and systems include handling multiple heterogeneous dispatch systems, preventing deadlock in single threaded servers, optimizing distributed activities, homogeneous identification of heterogeneous resources and automatically distributing failed tasks within a distributed system.

55 Claims, 17 Drawing Sheets

U.S. PATENT DOCUMENTS

| | | | |
|---|---|---|---|
| 7,039,914 B2 * | 5/2006 | Potter, Jr. | 718/102 |
| 7,058,949 B1 * | 6/2006 | Willen et al. | 718/104 |
| 7,093,259 B2 * | 8/2006 | Pulsipher et al. | 718/106 |
| 7,130,891 B2 * | 10/2006 | Bernardin et al. | 709/218 |
| 7,171,484 B1 * | 1/2007 | Krause et al. | 709/232 |
| 7,171,623 B2 * | 1/2007 | Hand et al. | 715/734 |
| 7,287,255 B2 * | 10/2007 | Potter, Jr. | 718/102 |
| 7,418,718 B2 * | 8/2008 | Liu et al. | 719/328 |
| 7,996,839 B2 * | 8/2011 | Farkas et al. | 718/102 |
| 2001/0039542 A1 | 11/2001 | Okada et al. | |
| 2002/0116205 A1 | 8/2002 | Ankireddipally et al. | |
| 2003/0120701 A1 | 6/2003 | Pulsipher et al. | |
| 2003/0120708 A1 | 6/2003 | Pulsipher et al. | |
| 2003/0120709 A1 | 6/2003 | Pulsipher et al. | |
| 2003/0120710 A1 | 6/2003 | Pulsipher et al. | |
| 2004/0205124 A1 | 10/2004 | Limprecht et al. | |
| 2005/0165881 A1 * | 7/2005 | Brooks et al. | 709/200 |

OTHER PUBLICATIONS

U.S. Appl. No. 09/850,521, filed May 4, 2001, entitled "Distributed Transaction Processing System."

* cited by examiner

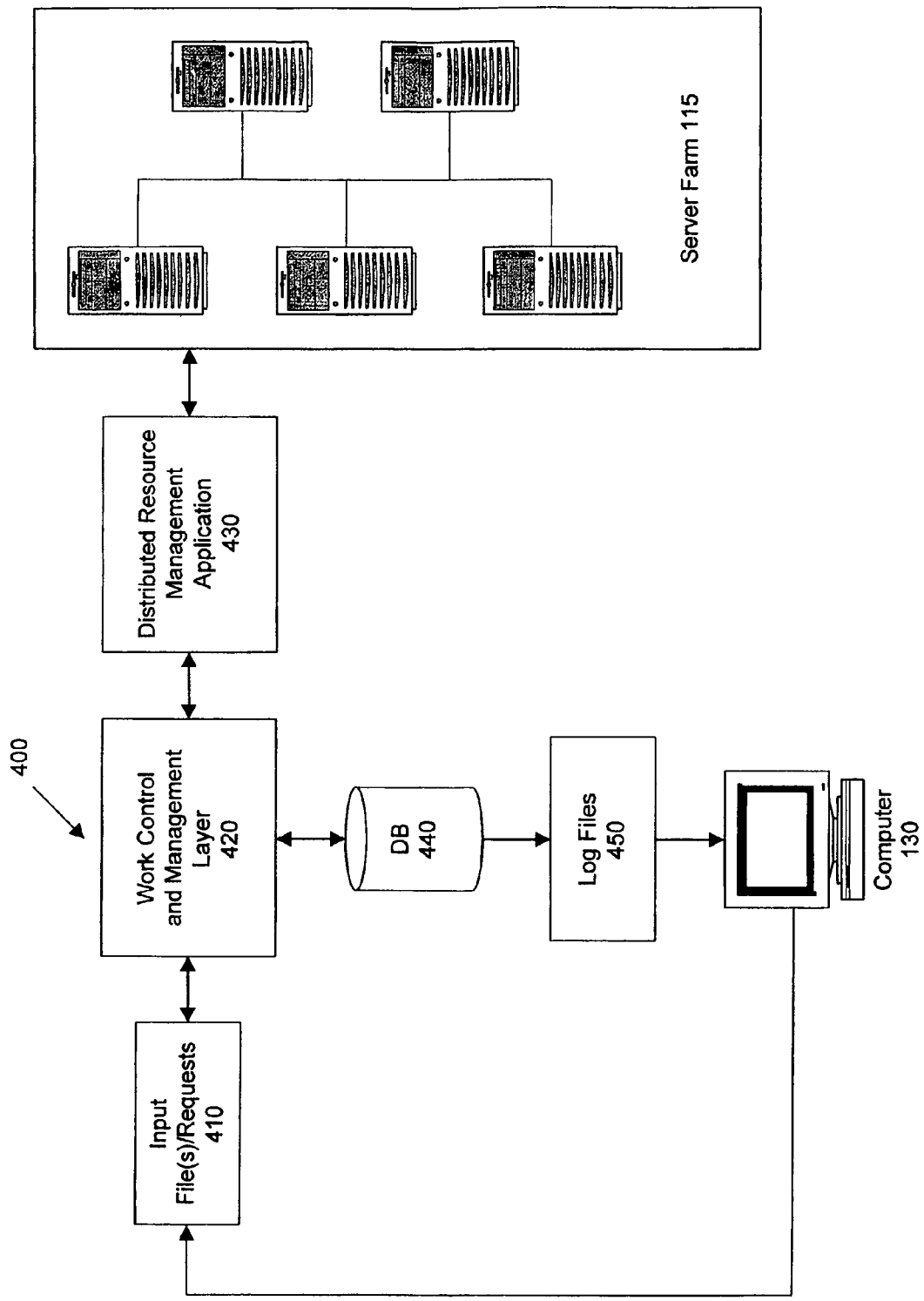

Work Inheritance

Work States

Work States

TASK STATES

| Name | | Time | | |
|---|---|---|---|---|
| 1 | BuildCycle(B01) | Finishes when all sub-work is finished | | |
| 1.1 | Build3rdParty(B01) | Note: Finishes after 1.1.1 and 1.1.2 | | |
| 1.1.1 | Build3rdPartyTool(B01, "1") | Finishes after 1.1.1.1 | | |
| 1.1.1.1 | make tool1 | | | |
| 1.1.2 | Build3rdPartyTool(B01, "2") | Finishes after 1.1.2.1 | | |
| 1.1.2.1 | make tool2 | | | |
| 1.2 | preBuild.pl B01 | Start after 1.1 | | |
| 1.3 | BuildComponent(B01, "1") | Start after 1.2 | | Finish after 1.3.3 |
| 1.3.1 | premake.pl component 1 | | | |
| 1.3.2 | make component 1 | Start after 1.3.1 | | |
| 1.3.3 | postmake.pl component 1 | Start after 1.3.2 | | |
| 1.4 | BuildComponent(B01, "2") | Start after 1.2 | | Finish after 1.4.3 |
| 1.4.1 | premake.pl component 2 | | | |
| 1.4.2 | make component 2 | Start after 1.4.1 | | |
| 1.4.3 | postmake.pl component 2 | Start after 1.4.2 | | |
| 1.5 | BuildComponent(B01, "3") | Start after 1.2 | | Finish after 1.5.3 |
| 1.5.1 | premake.pl component 3 | | | |
| 1.5.2 | make component 3 | Start after 1.5.1 | | |
| 1.5.3 | postmake.pl component 3 | Start after 1.5.2 | | |
| 1.6 | postMake.pl B01 | Start after 1.3, 1.4, and 1.5 | | |

TASK TIMING

Fig. 4F

Job States

Table 2-1 Timing Chart

Labels on timing columns: Created, Pending, Blocked, Active, Completed

| Name | | Time |
|---|---|---|
| 1 | BuildCycle(B01) | |
| 1.1 | GatherCode(B01) | Finishes after 1.1.1 and 1.1.2 |
| 1.1.1 | MergeCode (B01) | |
| 1.1.2 | Get3rdParty (B01) | |
| 1.2 | BuildComponent (B01, "1") | Start after 1.1 / Finishes after 1.2 * |
| 1.2.1 | BuildProduct (B01) | Start w/Parent |
| 1.2.2 | BuildComponent (B01, "1") | Start w/Parent |
| 1.2.3 | BuildComponent (B01, "2") | Start w/Parent |
| 1.2.4 | BuildComponent (B01, "3") | Start w/Parent |
| 1.3 | TestProduct (B01) | Starts when 1.2 is finished / Finishes after 1.3 |
| 1.3.1 | TestComponents (B01) | Start with 1.3 |
| 1.3.1.1 | TestComponent (B01, "1") | Start with 1.3.1 / Finishes after 1.3.1 * |
| 1.3.1.2 | TestComponent (B01, "2") | Start with 1.3.1 |
| 1.3.1.3 | TestComponent (B01, "3") | Start with 1.3.1 |
| 1.3.2 | TestSystemIntegration (B01) | Start with 1.3.1 |
| 1.3.3 | TestSystemFlow (B01) | Start with 1.3.1 |
| 1.4 | PackageProduct (B01) | Start after 1.3 |
| 1.4.1 | Gather3rdParty (B01) | |
| 1.4.2 | GatherBinaries (B01) | |
| 1.4.3 | CreateInstallation (B01) | |
| 1.4.4 | CreatePackage (B01) | |

JOB TIMING

Fig. 4H

METHOD AND APPARATUS FOR MANAGING A DISTRIBUTED COMPUTING ENVIRONMENT

CROSS REFERENCE TO RELATED APPLICATIONS

This application claims priority under 35 U.S.C. §119 of U.S. Provisional Application No. 60/634,718, filed Dec. 8, 2004, entitled "Method and Apparatus for Handling Multiple Heterogeneous Dispatch Systems," the contents of which are incorporated herein by reference.

This application also claims priority under 35 U.S.C. §119 of U.S. Provisional Application No. 60/634,628, filed Dec. 8, 2004, entitled "Method and Apparatus for Deadlock Prevention in Single Threaded Servers," the contents of which are incorporated herein by reference.

This application also claims priority under 35 U.S.C. §119 of U.S. Provisional Application No. 60/634,719, filed Dec. 8, 2004, entitled "Method and Apparatus for Optimizing Distributed Activities," the contents of which are incorporated herein by reference.

This application also claims priority under 35 U.S.C. §119 of U.S. Provisional Application No. 60/634,687, filed Dec. 8, 2004, entitled "Method and Apparatus for Homogeneous Identification of Heterogeneous Resources," the contents of which are incorporated herein by reference.

This application also claims priority under 35 U.S.C. §119 of U.S. Provisional Application No. 60/634,720, filed Dec. 8, 2004, entitled "Method and Apparatus for Automated Distribution of Failed Tasks Within a Distributed Computing System," the contents of which are incorporated herein by reference.

This application claims priority 35 U.S.C. §119 of U.S. Provisional Application No. 60/634,481, filed Dec. 8, 2004, entitled "Method and Apparatus for Operation of Distributed Computing Systems," the contents of which are incorporated herein by reference.

This application is related to co-pending U.S. application Ser. Nos. 10/247,970, 10/251,230, 10/251,019, and 10/251,747, filed on Sep. 19, 2002, and U.S. Provisional Application Ser. No. 60/342,630, filed on Dec. 20, 2001, the contents of which are incorporated herein by reference.

FIELD OF THE INVENTION

The present invention relates generally to distributed computing system and, more particularly, to managing and optimizing processing on a distributed computing grid.

BACKGROUND

Distributed or grid computing provides the ability to share and allocate processing requests and resources among various nodes, computers or server farm(s) within a grid. A server farm is generally a group of networked servers or, alternatively, a networked multi-processor computing environment, in which work is distributed between multiple processors. Workload is distributed between individual components or processors of servers. Networked servers of a grid can be geographically dispersed. Grid computing can be confined to a network of computer workstations within a company or it can be a public collaboration.

Resources that are distributed throughout the grid include various objects. An object is a self-contained module of data and associated processing that resides in a process space. There can be one object per process or tens of thousands of objects per process.

A server farm environment can include different classes of resources, machine types and architectures, operating systems, storage and hardware. Server farms are typically coupled with a layer of load-balancing or distributed resource management (DRM) software to perform numerous tasks, such as managing and tracking processing demand, selecting machines on which to run a given task or process, and scheduling tasks for execution.

Current distributed computing systems, however, can only handle homogeneous systems for distribution of chore. In other words, they cannot handle multiple heterogeneous paths without custom modification.

Further, there is a need in the industry to be able to talk to multiple vendors of dispatch systems, both commercial and non-commercial, and to talk to multiple dispatch systems at the same time. That is, to provide a product that has the flexibility of working in an existing-environment and migrating to other environments that are constantly changing. What is needed is a system that is able to submit to multiple distributors, and pick the appropriate distributor for the chore that is going to be run. There is also a need for a system that can handle exception cases, such as a case when a distributor was selected because it was available at that time, but by the time that the system distributed the chore for distribution, the selected distributor could no longer handle the chore.

There is also a need for a method and apparatus to prevent deadlock in single threaded servers of a distributed computing system. Single threaded servers can easily become deadlocked by the failure to accurately match requests with replies when replies are received out of sequence. That is, in single threaded systems, replies to requests must be sequentially matched with their original requests. If a reply comes back to the system out of sequence (it does not match the most recent request), the server will be unable to handle the reply, thus deadlocking the system.

More specifically, in systems that do not use multi-threaded servers, multiple messages can be received, and sometimes, when someone requests a message, it will create additional messages that need to be sent out to other objects. These messages have to be sent out and the results received before the response to the original request can be processed. As a result, there can be deadlock situations. Thus, there a need exists for a method and apparatus to prevent deadlock in single threaded servers so that a computer can be both a client and a server in the same process thread.

Additionally, in modern distributed networks, individual tasks are bundled together into chores for distribution and/or dispatch onto the grid. However, the current process for bundling tasks together into chores is generally performed based upon a dispatch policy that typically does not account for available resources. Current systems do not optimize tasks that are contained in a chore to match the available resources. Accordingly, there is a need for a system and method that can optimize tasks that are contained in a chore to match available resources.

Further, customers need a method of defining a task with resource requirements, independent of the distributor and/or system on which the task will execute. Thus, a need exists for a method and apparatus to map homogeneous task resource definitions to a dynamically changing set of distributor resource pools of different types.

Additionally, in current systems, if any task within a chore fails, then the entire chore can fail. That is, if a chore fails half-way through the lists of tasks it's executing, then all of the tasks in that chore would fail. Thus, what is needed is a system that can retry tasks within a chore if a partial failure of a chore occurs that has multiple tasks within it.

Embodiments fulfill these unmet needs.

SUMMARY

One embodiment of the invention is directed to a method for managing multiple heterogeneous dispatch systems in a computing grid. The method includes receiving a request to dispatch a chore onto the distributed computing grid for processing, selecting a first distributor based on selection criteria and attempting to dispatch the chore to the first distributor. The selection criteria is modified if the dispatch to the first distributor fails. Then, a second distributor is selected based on the modified selection criteria, and an attempt is made to dispatch the chore to the second distributor. Other distributors can be selected if the second distributor does not dispatch the chore. The chore can be terminated if not suitable distributor is located.

The selection criteria or modified selection criteria can be a statistical model received from a gatherer. For example, the gatherer can generate a first statistical model representing data in intervals of a first time for a first period. The selection criteria can also be a second statistical model, which is based on the first statistical model and represents data in intervals of a second time during a second period. The selection criteria can also be based on a predetermined policy or based on a user-specified or user-defined policy.

A further embodiment of the invention is directed to a method for preventing deadlock in single threaded servers of a distributed computing grid. The method includes dispatching requests over the distributed computing grid, receiving replies in response to the requests and matching the dispatched requests with the received replies. A computer on the distributed computer grid serves as both a client and a server in the same process thread to process the requests and replies.

In a further embodiment, a method for preventing deadlock in single threaded servers of a distributed computing grid includes dispatching requests that are asynchronous over the distributed computing grid and receiving replies in response to the asynchronous requests. The received replies are matched with the asynchronous requests. A computer on the distributed computer grid serves as both a client and a server in the same process thread to process the requests and replies.

Another alternative embodiment is directed to a method for optimizing distributed activities by matching a chore to available resources on a distributed computing grid. The method includes receiving a first request concerning a resource on the grid and identifying tasks that match the resource. The identified tasks are assigned to or combined into a chore, which is dispatched onto the grid for processing. A policy can be used to determine whether a chore will be dispatched onto the grid. The policy can be, for example, defined by a user. The policy can be changed as needed. If the chore does not satisfy the policy, then additional tasks that match the resource can be added to the chore to form a modified chore, which is dispatched onto the grid for processing.

A further alternative embodiment is directed to a method for homogeneous identification of heterogeneous resources on a distributed computing grid. The method includes gathering heterogeneous resource information from distributors that dispatch chores onto the distributed computing grid and converting the gathered heterogeneous resource information to homogeneous resource information. A map is created of available resources based on the homogenous resource information, and a homogeneous task resource specification is updated using the map. Tasks are assigned to a chore based on the updated task resource specification, and the chore is dispatched onto the grid. As a result, the chore changes resource information, and the map is updated to reflect the changed resource information. A map is dynamically updated without receiving information from a resource.

A further alternative embodiment is directed to a method for automatically distributing failed tasks within a distributed computing grid. The method includes dispatching a first chore onto the grid and determining which tasks within the dispatched chore were not processed or executed. These unexecuted tasks are then assigned to a second chore.

BRIEF DESCRIPTION OF THE DRAWINGS

Referring now to the drawings, in which like reference numbers represent corresponding parts throughout, and in which:

FIG. 4A is a block diagram generally illustrating a grid computing environment having a work control and resource management elements;

FIG. 4F illustrates timing of tasks;

FIG. 4H illustrates timing of jobs;

DETAILED DESCRIPTION OF ILLUSTRATED EMBODIMENTS

Embodiments of the invention enhance distributed grid computing systems or environments by providing a method and system for determining whether a deadlock situation exists. If not, processing continues. The deadlock analysis can go down a workflow tree and determine dependencies, determine whether any dependency recursions or loops exist, and If a deadlock is identified, then a notification is made, e.g. to the user, that tells the user where the deadlock has occurred.

The deadlock can be automatically addressed, e.g., by stopping a job or processing entity, or by releasing a resource that is needed for processing.

Embodiments of the invention can be executed in a single computer (e.g., a client computer) or in multiple computers, e.g., between a client and one or more servers across a network connection and in various distributed computing environments. FIGS. 1-4I illustrate one exemplary computing environment or "grid" in which system and method embodiments for gathering, modeling and presenting resource data can be implemented. A "grid" is generally known as a collection of nodes, resources or hosts, each of which contributes one or more resources to the grid. The following description of an exemplary grid is provided for purposes of explanation and illustration. Persons skilled in the art will appreciate that embodiments can be used in other distributed computing environments.

Figure 1:
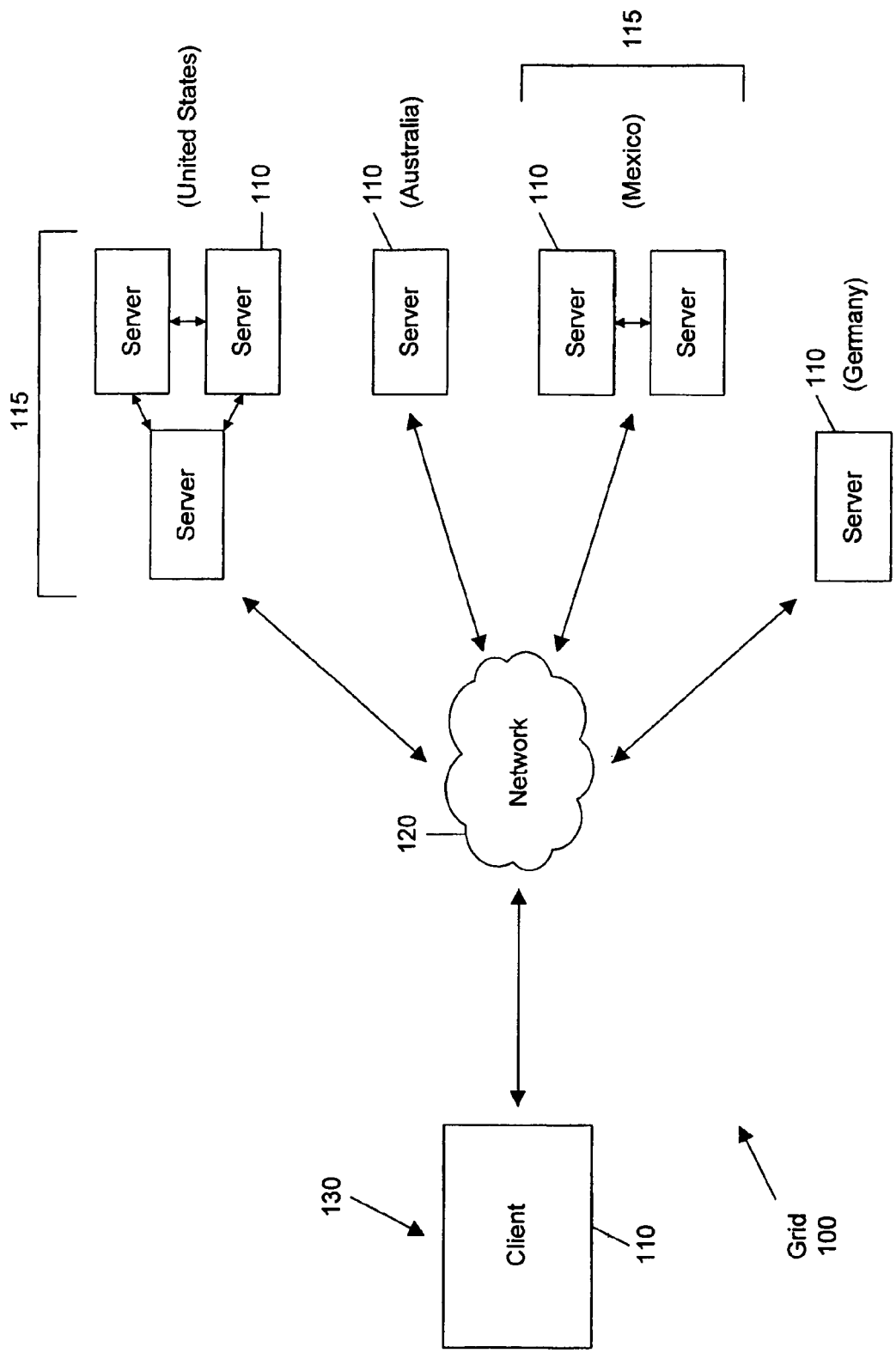
FIG. 1 is a block diagram generally illustrating a grid computing environment in which embodiments can be implemented.
Figure 2:
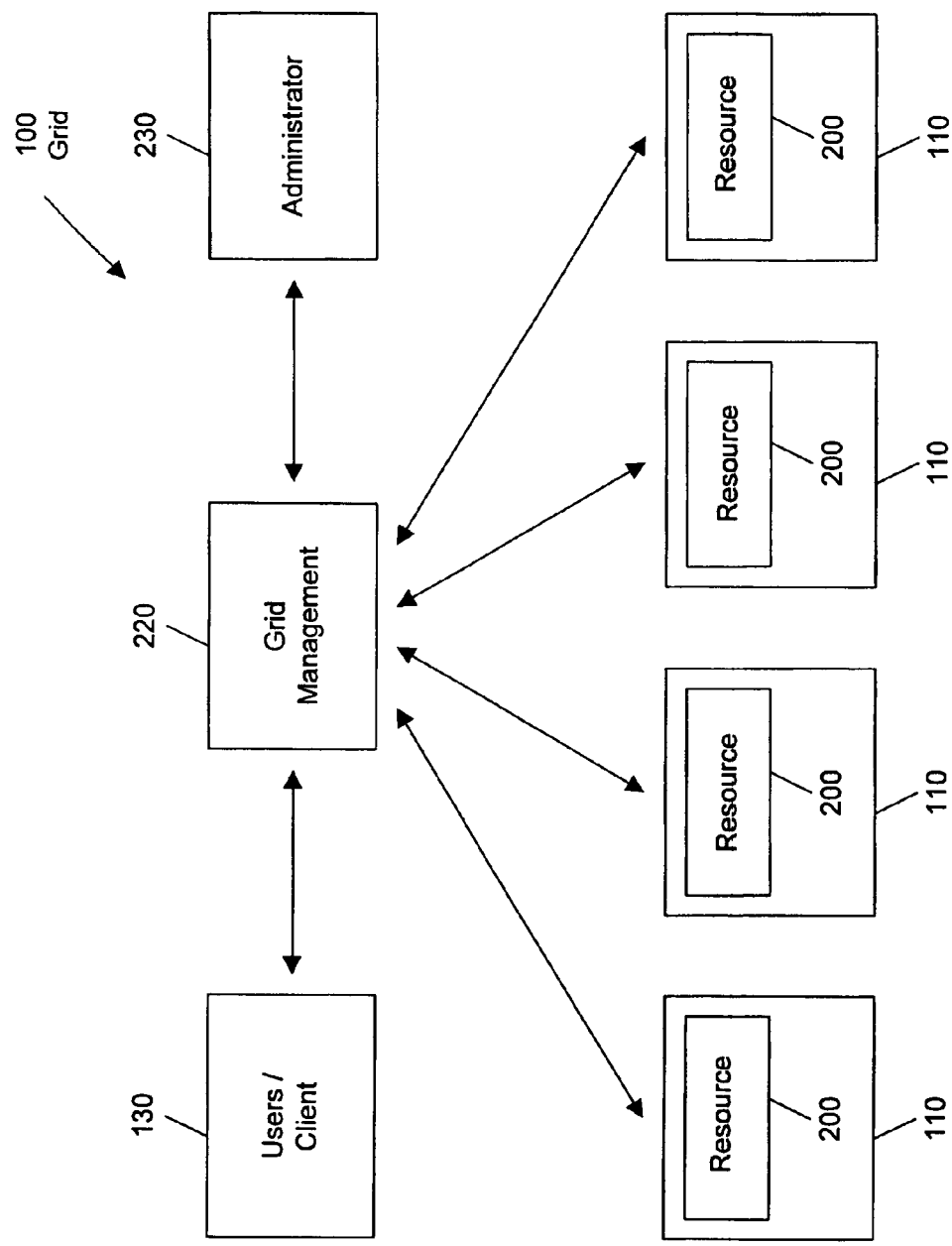
FIG. 2 is a block diagram further illustrating grid management and resources in a grid computing environment.

FIGS. 1 and 2 generally illustrate one exemplary computing grid 100 that includes various numbers of servers 110 or groups of servers or server farms or clusters 115, which are connected via a communication link 120. The communication link 120 can be a network connection, such as a Local Area Network (LAN), a Wide Area Network (WAN), and a Public Switched Telephone Network (PSTN). One computer 130 is identified as the client or the requesting entity, which issues a request for a resource from one or more of the servers 110. The request can be made by, for example, a client process or an object This specification generally refers to a client requesting entity for purposes of explanation, not limitation.

One or more servers 110 in one location can be connected to one or multiple or all of the other servers 110 of the grid via network 120. A server farm 115 or group of servers can be one node or component in a grid 100. Thus, a grid 100 can include different numbers of nodes or server farms 115. The grid 100 can also be distributed across different geographic domains, such as across offices (e.g., offices in the same or different location), different cities, states, countries and continents. Thus the grid may be local and/or external. For purposes of illustration, not limitation, FIG. 1 illustrates a grid 100 that is distributed across different continents. The client or requesting entity 130 is considered to be local or internal and the other servers 110 connected to the network 120 are external relative to the client 130.

The grid 100 can be used to, for example, run an application on multiple servers, allocate computing resources among grid components, provide parallel processing and provide enhanced data storage and processing capabilities. The grid 100 can also be used to allocate and share equipment, software and licenses. For example, if resource on a server 110 is overloaded, a job request can be directed to another server in the grid that has that resource so that the request can be processed. This specification generally refers to a grid in the context of distributed computing and resource allocation, however, grid environments can also be used with other applications, such as communications involving cell phones and personal digital assistants (PDAs).

Referring to FIG. 2, a grid 100 is generally an interconnected set of nodes or servers 110, which host one or more resources 200. The same resource 200 can reside on one or more or all of the servers 110. The resources 200 and organization and control thereof can be managed 220 and controlled by an administrator 230.

Figure 3:
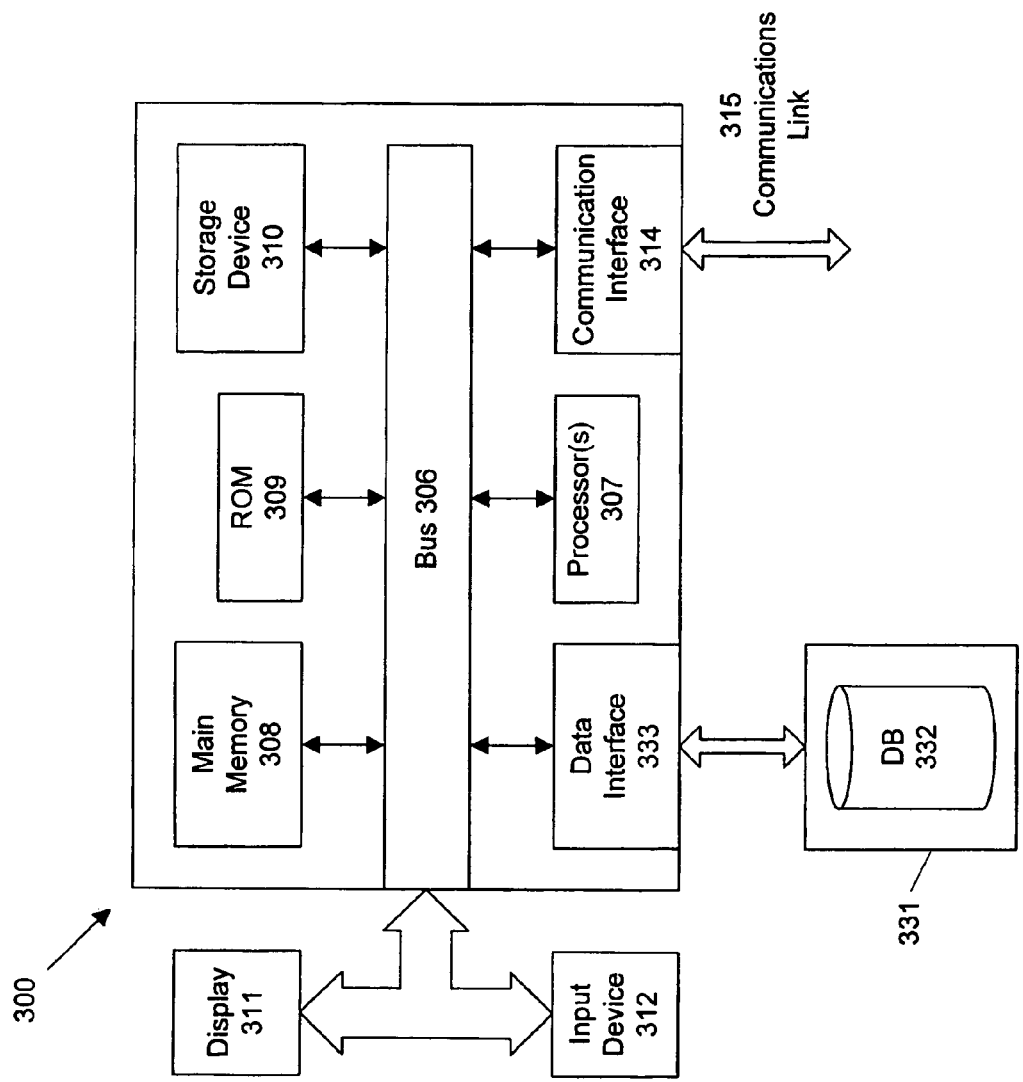
FIG. 3 is a block diagram of an exemplary server of a computing grid.

One exemplary computer system or server 110 that can be used in the grid 100 is shown in FIG. 3. The terms server, computer and computer system are broadly used to describe any computing device that can store and run one or more programs to implement method and system embodiments. Sequences of instructions of embodiments can be performed by a single computer system or server 110 or two or more computer systems or servers 110 coupled by a communication link 315, which serves as an interface to a communications network 120.

Each computer system 300 may include a communication interface 314 coupled to a bus 306. The interface 314 provides two-way communication between computer systems 300 through communication link 315 and network 120. The communication interface 314 transmits and receives electrical, electromagnetic or optical signals that include data streams representing various types of signal information, e.g., instructions, messages and data. The communication link 315 connects one computer system 300 with another computer system 300. For example, the communication link 315 may be a LAN, in which case the communication interface 314 may be a LAN card, or the communication link 315 may be a PSTN, in which case the communication interface 314 may be an integrated services digital network (ISDN) card or a modem, or the communication link 315 may be the Internet, in which case the communication interface 314 may be a dial-up, cable or wireless modem. Other communication interfaces and links can be utilized as needed. The computer system 300 may transmit and receive messages, data, and instructions, including program, such as an application or code, through its respective communication link 315 and communication interface 314. The received program code may be executed by the respective processor(s) 307 as it is received, and/or stored in the storage device 310, or other associated non-volatile media, for later execution.

The computer system 300 can operate in conjunction with a data storage system 331, e.g., a data storage system that contains a database 332 that is accessible by the computer system 300. The computer system 300 communicates with the data storage system 331 through a data interface 333 coupled to the bus 306. The system 300 transmits and receives electrical, electromagnetic or optical signals, that include data streams representing various types of signal information, e.g., instructions, messages and data. In embodiments, the functions of the data interface 333 may be performed by the communication interface 314.

The system 300 includes a bus 306 or other mechanism for communicating instructions, messages and data, collectively, information, and one or more processors 307 coupled with the bus 306 for processing information. The system 300 also includes a main memory 308, such as a random access memory (RAM) or other dynamic storage device, coupled to the bus 306 for storing dynamic data and instructions to be executed by the processor(s) 307. The main memory 308 also may be used for storing temporary data, such as variables and other intermediate information during execution of instructions by the processor(s) 307.

The system 300 may further include a read only memory (ROM) 309 or other static storage device coupled to the bus 306 for storing static data and instructions for the processor(s) 307. A storage device 310, such as a magnetic disk or optical disk, may also be provided and coupled to the bus 306 for storing data and instructions for the processor(s) 307. The computer system 300 may be coupled via the bus 306 to a display device 311, such as, a cathode ray tube (CRT), for displaying information to a user. An input device 312, e.g., alphanumeric and other keys, is coupled to the bus 306 for communicating information and command selections to the processor(s) 307.

An individual computer system 300 performs specific operations by their respective processor(s) 307 executing one or more sequences of one or more instructions contained in the main memory 308. Such instructions may be read into the main memory 308 from another computer-usable medium, such as the ROM 309 or the storage device 310. Execution of the sequences of instructions contained in the main memory 308 causes the processor(s) 307 to perform the processes described herein. Hard-wired circuitry may be used in place of or in combination with software instructions. Persons skilled in the art will appreciate that OL system and method embodiments can be implemented using other computer systems and hardware and/or software.

Further, embodiments may be stored on various types of computer-usable medium, which is any medium that provides information or is usable by the processor(s) 307. Exemplary media include non-volatile, volatile and transmission media. Non-volatile media, i.e., media that can retain information in the absence of power, includes the ROM 509, CD ROM, magnetic tape, and magnetic discs. Volatile media, i.e., media that can not retain information in the absence of power, includes the main memory 308. Transmission media includes coaxial cables, copper wire and fiber optics, including the wires that comprise the bus 306, and can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Referring to FIG. 4A, according to one embodiment, control and management 220 of the grid 100 and requests issued over the grid 100 is performed using gridMatrix 400, developed by Cadence Design Systems, Inc., 2655 Seely Avenue San Jose, Calif. 95134. The gridMatrix 400 is middleware or software that provides users and administrators control over jobs in the grid. More specifically, the gridMatrix 400 is a job definition, control monitoring and reporting software program.

The exemplary system or environment includes a workstation or client computer 130, from which a user can create and submit one or more input files 410. The input files 410 can be, for example, Job Request Language (JRL) files, that define a work request specifying one or more jobs having one or more executable task commands. Processes use JRL in conjunction with the control and management layer 420, one example of which is the gridMatrix 400, to manage execution of work in the grid 100.

The gridMatrix 400 interprets JRL files 410 and compiles them into objects, which execute on a server 110 or server farm 11 or invoke executables to be run on a server 110. Typically, the objects are passed through the DRM application 430 that schedules and manages work to be run on the processors 107 of a server 110. More specifically, the gridMatrix 400 interprets JRL work requests 410, instantiates distributed objects, invokes software servers to manage execution of commands, and interfaces with DRM 430 applications.

The commands and data correspond to the work that is defined in the input file 410. Thus, the gridMatrix 400 interprets and acts upon the input file 410 and causes the DRM application 430 to execute task commands on a server 110. The database 440 stores information related to many of the processes described herein.

For example, task commands constituent to a piece of work are essentially instantiated into computing objects, which are maintained persistently in the database 440. A persistent object is an object that continues to exist after the program that created it has been unloaded and is stored for later use. Persons skilled in the art that "persistent" in the context of an object generally refers to the duration of the object. Embodiments, therefore, are not to be limited to objects that exist for particular periods of time. Rather, persistent objects may be permanent or temporary and exist for various durations.

Objects are also made to be distributable so that they are accessible to different processes within the work execution flow. Implementation of a conventional distributed object model architecture, such as Common Object Request Broker (CORBA), can be used. CORBA or another suitable standard provides the ability to communicate between objects. A database module of the gridMatrix 400 contains base classes for all objects in the database 440.

An artifact is a piece of data that is used, generated or discarded while working with the grid. Artifacts that are used by the gridMatrix 400 include job definitions, work, tasks, jobs, and workspaces. Each of these artifacts is described in further detail below.

A job definition defines jobs and tasks that will be run when a job is submitted to the gridMatrix 400. The gridMatrix 400 allows users to add job definitions via JRL into the gridMatrix Database. The gridMatrix 400 keeps statistics on job runs, and this information can be presented in text and graphic formats to optimize job definitions for greater efficiency. JRL is the primary mechanism used to import a job definition into the gridMatrix 400. Job definitions can be added to the gridMatrix 400 and stored in a gridMatrix database. One benefit of adding a job definition is that the gridMatrix 400 can store historical information about consecutive job runs which use the same job definition. This information can be analyzed to help determine where the problems are in the process and help optimize the process for decreased execution time. After running a job against a job definition, the definition can be changed to fix problems with the process, to optimize this process, or to add more jobs to the definition.

The gridMatrix 400 can gather statistics from running jobs against the same job definition several times. Trends of execution time, duration, and pending time are given in a graph to show how the process is performing over time. Duration is the wall clock amount of time to run the job from submission to completion. Pending is the amount of time it takes the DRM 430 to dispatch the jobs to machines in the grid 100. Sequential is the cumulative amount of time it takes to run the tasks on machines in the grid 100 (i.e., if run sequentially, how long it would take).

Figure 4B:
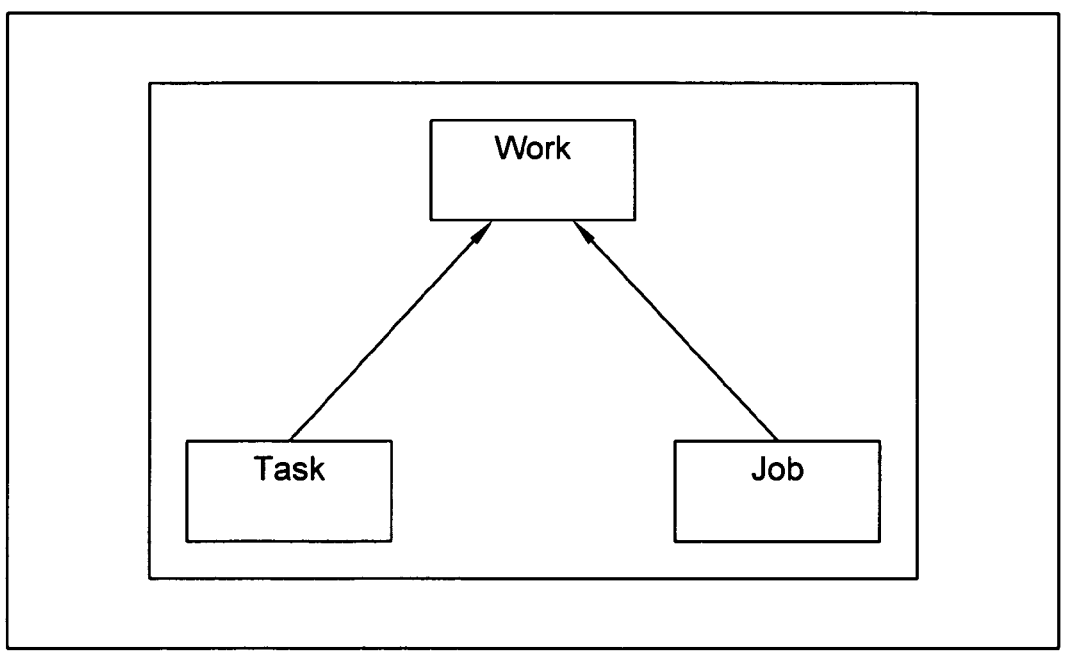
FIG. 4B illustrates jobs and tasks as different types of work.

Referring to FIG. 4B, "work" or "workflow" represents all types of work, including jobs, topjobs and tasks. Work, and constituent jobs, can be defined with one or more JRL files. Work and workflow are generic terms for anything that the gridMatrix 400 can execute and control. Thus, "work" and "workflow" are generic terms for anything that the work control and management layer 420 can control, execute, or cause to be executed.

Work may include processes to compile or build a program, to create file directories, install applications, maintain job dependencies, etc. In other words, work includes whatever a user needs to be performed or processed.

Figure 4C:
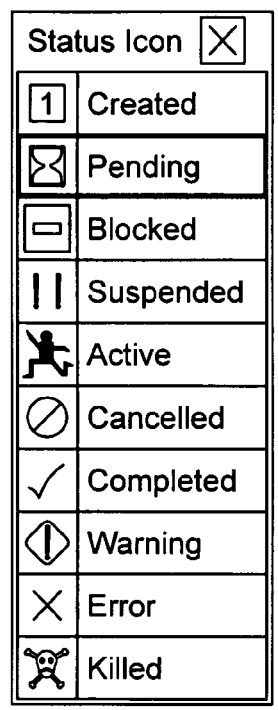
FIG. 4C illustrates states of work.
Figure 4D:
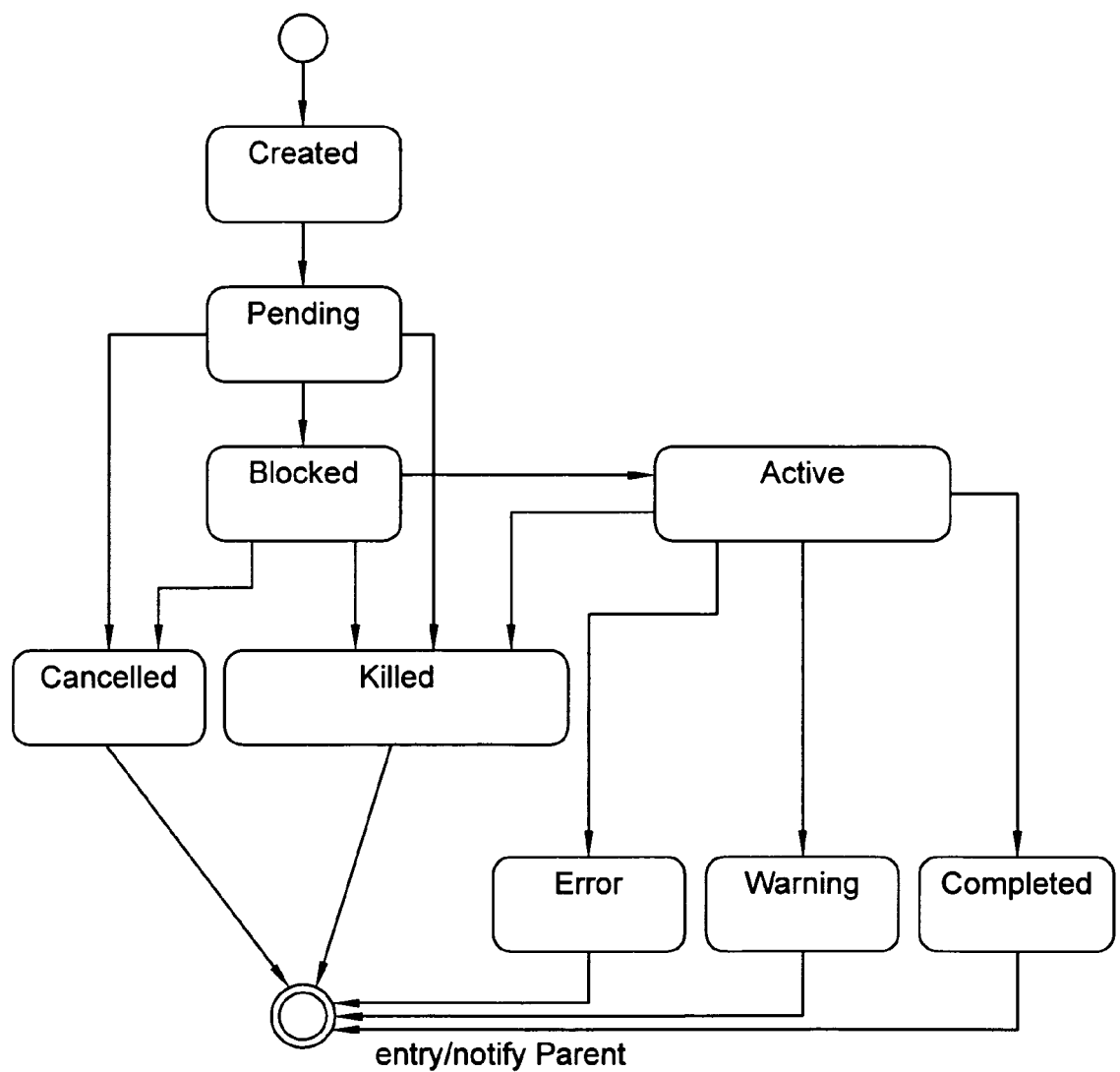
FIG. 4D further illustrates states of work.

Referring to FIGS. 4C and 4D, according to one embodiment, there are nine work states in the gridMatrix 400. Each states determines the behavior of the work and limits the next state(s) that it can transition into.

More specifically, the created state is the starting state of all work in the gridMatrix 400. Work will move from the created state to a scheduled state when scheduled for execution. The "pending" state follows the created state and denotes that work has been scheduled, but has not been sent to be executed. When work is sent for execution, it moves to the "blocked" state. In other words, after work has been pending, it moves to the blocked state, which denotes that the work has not met the criteria to be executed. When the criterion for the work has been met, the work will be moved to the active state. Tasks may be suspended until manual intervention to resume is performed. When work has met the criteria for leaving the blocked state, it moves to the active state. Work that completes its activity without warning, error or termination, transitions from the active state to the completed state. This state is also referred to as the successfully completed state. Work that is completed with some warnings, but no errors or termination, transitions from the active to warning state. The conditions for completion of work with warnings can be specific to the type of work. Work that completes with some errors, but not termination, transitions from the active to error state. The conditions for completion of work with an error can be specific to the type of work. Work properly terminated using, for example, a "matrix kill" command, after the created state, but before entering one of the finished states (completed, warning and error), moves to the killed state. The actions and conditions for a killed state can be specific to the different types of work. Work can be cancelled when criteria for execution cannot be satisfied. This can be due to a number of different factors.

A task is represented in a job definition as described by JRL, much the same as the job is represented. A task is a type of work and inherits all of the operations from work. A task represents the actual command that needs to be called in the grid 100. In other words, a task is an atomic unit of work that is performed on a server 110 and is a command that is executed on one or more processors of a networked multi-processor computing environment.

Figure 4E:
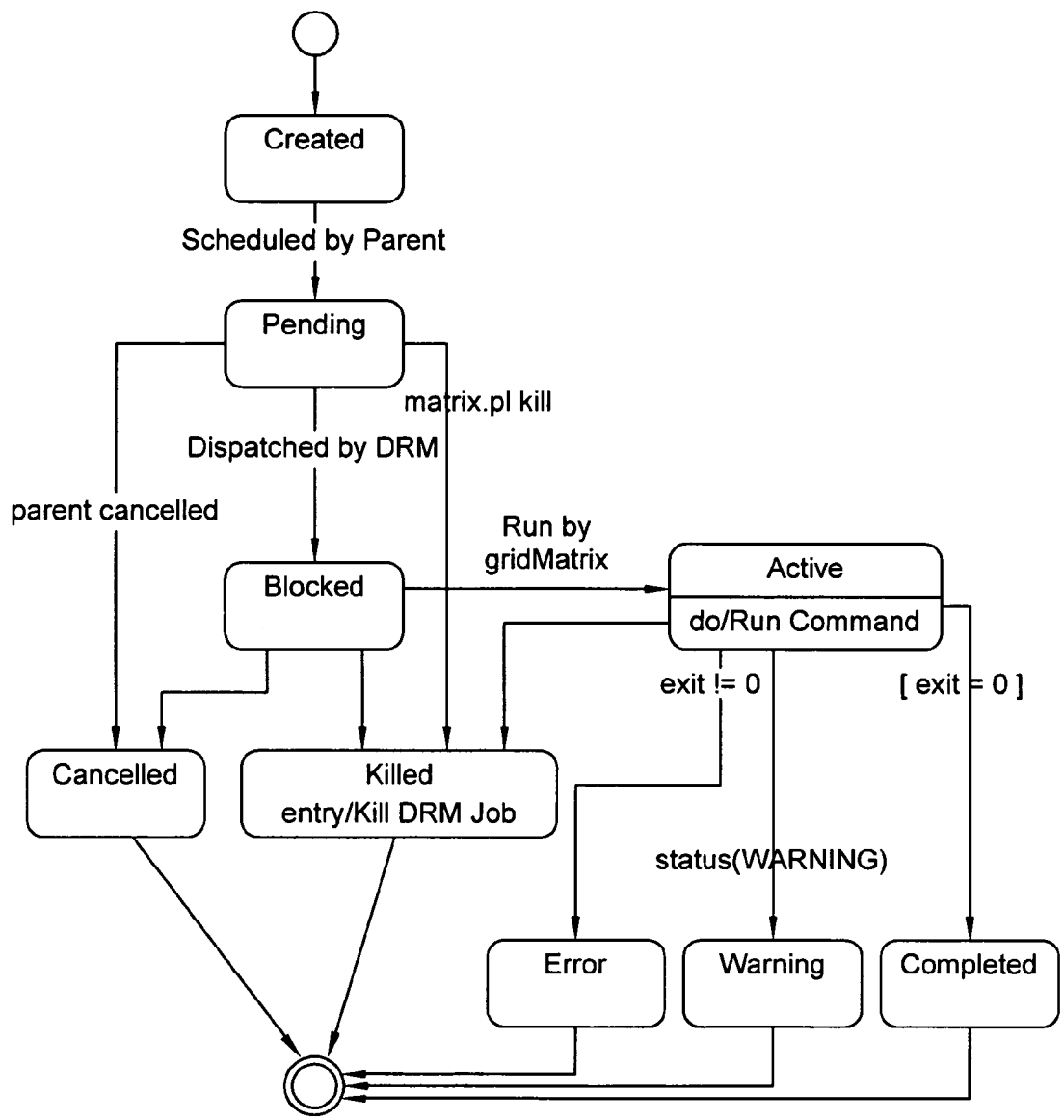
FIG. 4E illustrates states of a task.

Referring to FIG. 4E, a task has certain states. According to one embodiment, a task has the same states as work. A task begins in the created state. A task is moved from the created state to a pending state when a parent job schedules the task. The task is scheduled when the parent job is moved to the active state. Tasks in the pending state can be moved to the blocked state. A task is moved from the pending state to a blocked state when the task is submitted to the DRM 430. The task stays in the blocked state until the DRM 430 executes it. All tasks must move through the blocked state before actually performing work. The longer a task is in the blocked state, the longer it sits in the DRM 430 queues waiting to be distributed to a machine. The job will continue to stay in the blocked state until all of its dependencies have been satisfied. Tasks may be suspended until manual intervention to resume is performed. A task is moved from the blocked state to an active state when the task is actually executed on a host machine for the task.

A task is moved from the active state to a completed state when the corresponding command has finished executing. After the job is set to the completed state, it notifies its parent that it has finished. This is a type of state propagation that begins a chain of notification when a task's parent is notified. The parent will only change its state to completed when all of its children have the state completed.

A task can be moved from the active state to a warning state, after which the job notifies its parent that it has finished. This is a type of state propagation that begins a chain of notification when it's parent is notified. The parent will only change its state to warning when all of its children are in a finished state (completed, warning or error) and at least one in the warning state. A task is moved from the active state to an error state when the command executed returns a exit value that is not 0 (which is the standard failure exit code for commands). After the job is set to the error state, it notifies its parent that it has finished. This is a type of state propagation that begins a chain of notification when it's parent is notified. The parent will only change its state to error when one of its children have the state error. A task transitions from a previous (not finished) state to the killed state when a gridMatrix kill command is issued. The user can specify any of the jobs or tasks by ID when killing a job. When a task is moved to this state, it will kill all processes and sub processes of the executing command. The state propagation moves both up and down the tree. After the job completes "killing" its subwork, it notifies its parent that it has finished. The parent will only change its state to killed when all of its children are in a finished or a killed state. A killed state also results if a timeout is set for a job or task and the job doesn't finish in the set time. A task transitions from a pending or blocked state to a cancelled state when a parent is canceled. Since tasks do not have dependencies, they can not be cancelled directly. Rather, only their parent jobs can be cancelled, and as a result the task will never run, and it is marked cancelled.

Tasks in a job are run sequentially. A task does not start until all previous subworks are finished. If the previous subwork is a task, then it does not start until that task is completed. If the previous subwork is a job, then the task will not start until all previous jobs are complete.

FIG. 4F illustrates one example of timing of tasks. As can be seen in FIG. 4F, tasks are not in a pending state until its parent job is in an activate state (1.1.1.1.). Further, parent jobs are not completed until all of the tasks are completed (1.3). Additionally, tasks that are neat to each other in the job definition are run sequentially (1.5.1.3). When a task's command finishes, the exist status is set in the gridMatrix. For example, an error can be indicated by =!0, completed is indicated by =0.

A job is a type of work and represents a collection of jobs and/or tasks to be executed in the grid 100. Tasks are grouped together to form jobs. A job can be executed, controlled and reported by the management layer 420. Jobs can have zero or more sub-works, which can be a task or another job (i.e., sub-job). JRL provides the capability of defining jobs and passing parameters to the job definitions, which are instantiated as job objects. The parameters are used to create commands that represent tasks that execute on a server. The results of a task are maintained in a log file 450.

The gridMatrix 400 runs all jobs in parallel. All jobs can be run at the same time. Placing dependencies between the jobs lets the gridMatrix 400 know what order the individual tasks should be executed. The gridMatrix 400 gives the user the ability to define dependencies between jobs within the job definition. A job with a dependency, or multiple dependencies, does not execute until all dependencies are satisfied. More specifically, jobs encompass prerequisites and dependencies and can depend on any other job or subjob in a job definition. Job dependencies define the order that jobs are executed. A job may have 0 or more subworks, which can be a task or a job. This layering of jobs allows users to define complex multi-leveled job definitions in the gridMatrix 400. Thus, a user can break down complex processes into small and manageable steps that can be analyzed and controlled.

Figure 4G:
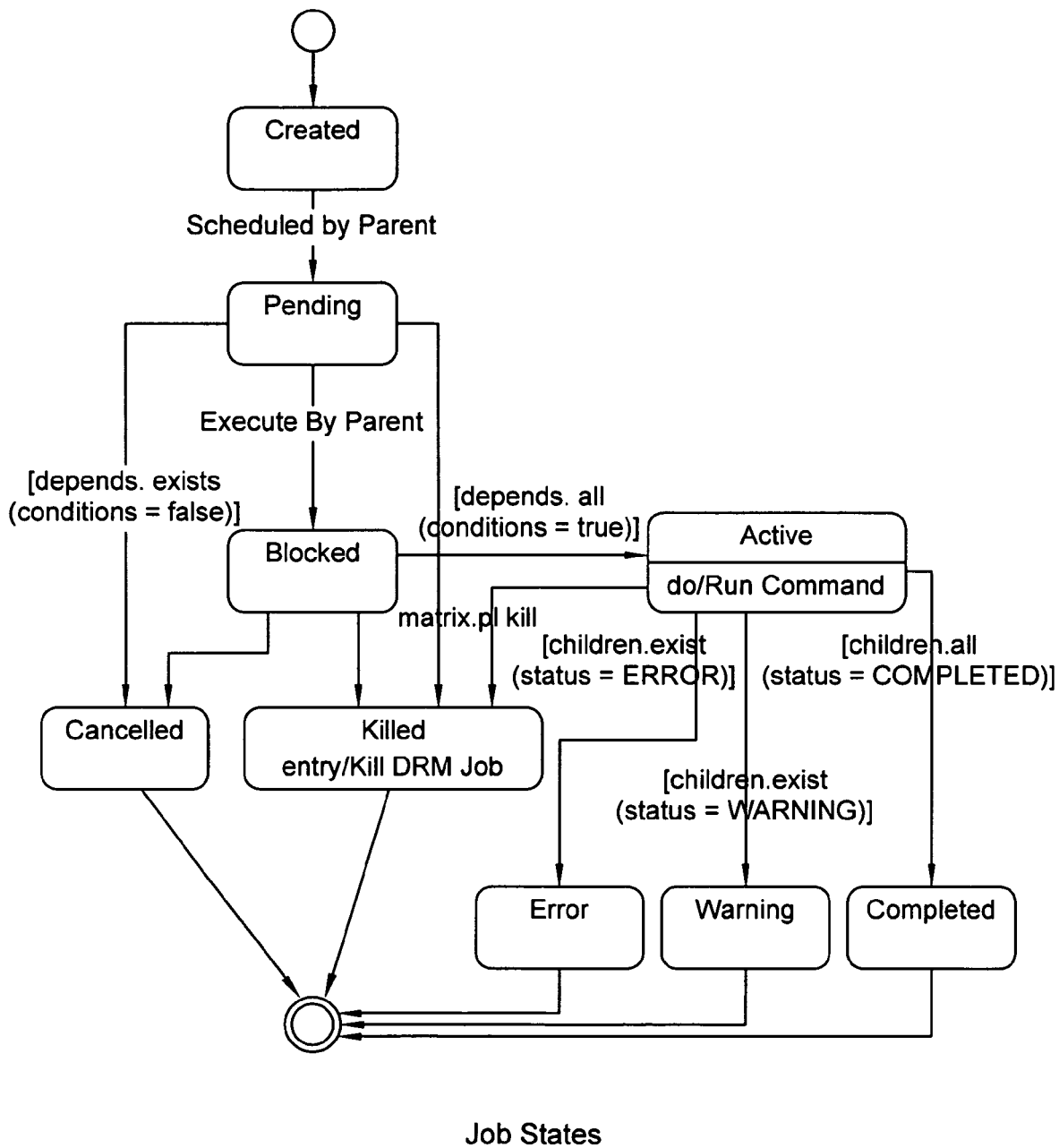
FIG. 4G illustrates states of a job.

Referring to FIG. 4G, a job has states that are similar to the states of work. The names of the states are the same, but there are additional ramifications to the states of a job. All jobs begin in the created state. A job is moved from the created state to a pending state when the parent job schedules the job. If the job is the top level job, it is scheduled by the gridMatrix when the job is submitted to be run. A job is moved from the pending state to a blocked state when the parent job executes the job. All jobs must move through the blocked state before actually performing work. The job will continue to stay in the blocked state until all of its dependencies have been satisfied. Tasks may be suspended until manual intervention to resume is performed.

A job is moved from the blocked state to an active state when all the dependencies of the job have been satisfied. Each time a dependent job finishes, a message is sent to the job that it depends on, and the gridMatrix 400 checks the dependency criteria for all of the dependent jobs. If all criteria are satisfied, the job can move into the active state. When a job is in the active state, all subworks are first scheduled (subworks are moved to the pending state) and then the gridMatrix 400 will execute all subwork of the job (all subworks are moved to the active state). This propagation of state continues to the leaf nodes of the job aggregation tree. The timing diagram for the job shows the propagation of state.

A job is moved from a pending or blocked state to a canceled state when the job's dependencies cannot be satisfied, e.g., when conditional dependencies are used. For example, if a job has a dependency on another job finishing in the error state and the job finishes in the completed state, then the job will be moved into the cancelled state and will never execute. After a job is moved into the cancelled state, it notifies its parent it has finished. This is another type of state propagation, but unlike the active state propagation that moves down the tree, this propagation goes from child to parent.

A job is moved from the active state to a completed state when all of its subworks have been moved to the completed state. When a subwork finishes, it notifies its parent that it has finished. The parent job checks the status of all of its subwork and sets the state to completed if all subwork is completed. After the job is sent to the completed state, it notifies its parent that it has finished. This is another type of state propagation, but unlike the active state propagation that moves down the tree, this propagation moves from child to parent. The parent will only change its state to completed when all of its children have the state completed.

A job is moved from an active state to a warning state when all of the job's subworks have been moved to a finished state (completed, warning or error) with some subworks state being warning. When a subwork finishes, it notifies its parent. The parent job checks the status of all of its subwork and sets the state to warning if at least one of the subworks is in the warning state. After the job is set to the warning state, it notifies its parent that it has finished. This is another type of state propagation, but unlike the active state propagation that moves down the tree, this propagation moves from child to parent. The parent will only change its state to warning when all of its children are in a finished state (completed, warning or error) and at least one in the warning state.

A job transitions from an active state to an error state when all of its subworks have been moved to a finished state (completed, warning or error) with at least one in the error state. When a subwork finishes, it notifies its parent that it has finished. The parent job checks the status of all of its subwork and sets the state to error if at least one of the subworks is in the error state. After the job is sent to the error state, it notifies its parent that it has finished. This is another type of state propagation, but unlike the active state propagation that moves, down the tree, this propagation goes from child to parent. The parent will only change its state to error when all of its children are in a finished state (completed, warning or error) and at least one in the error state.

A job transitions from a previous (not finished) state to the killed state when a kill command is used. The user can specify any of the jobs or tasks by ID when killing a job. When a job is moved to this state, it will set the state of all of its subwork that is not finished to the killed state. This propagation is similar to the active state propagation as it travels down the job aggregation tree "killing" all of the children down to the leaf nodes of the tree. In addition to moving down the tree, the state propagation moves up the tree in the same manner as the other finished states. After the job has "killed" its subwork, it notifies its parent that it has finished. The parent will only change its state to killed when all of its children are in a finished state or killed state.

FIG. 4H illustrates one example of timing of jobs. Subjobs are not submitted until a parent job is in an active state. (1.2; children 1.21-4). Further, all jobs pass through a blocked state before becoming active. Jobs with dependencies are put into a blocked state until dependent jobs are completed. For example, as shown in FIG. 4H, 1.3 starts after 1.2 finishes. Further, jobs are not completed until all children jobs are completed. This is true for all finished states (completed, warning and error).

Tasks are executed in an execution environment. The task's execution environment consists of environment variables and a directory hierarchy or working directory. The gridMatrix 400 allows users to define the directory hierarchy and working directory through a concept named workspace. All tasks are run with respect to a workspace. Workspace creation is controlled and monitored by the management layer 420 or the gridMatrix 400. After execution of the tasks within a given workspace, the resources associated with the given workspace are automatically deconfigured, or purged so that resources are freed up for use by other jobs. Further details concerning work, jobs, subjobs, tasks and workspaces are provided in the provisional and non-provisional applications that were incorporated herein by reference.

Figure 4I:
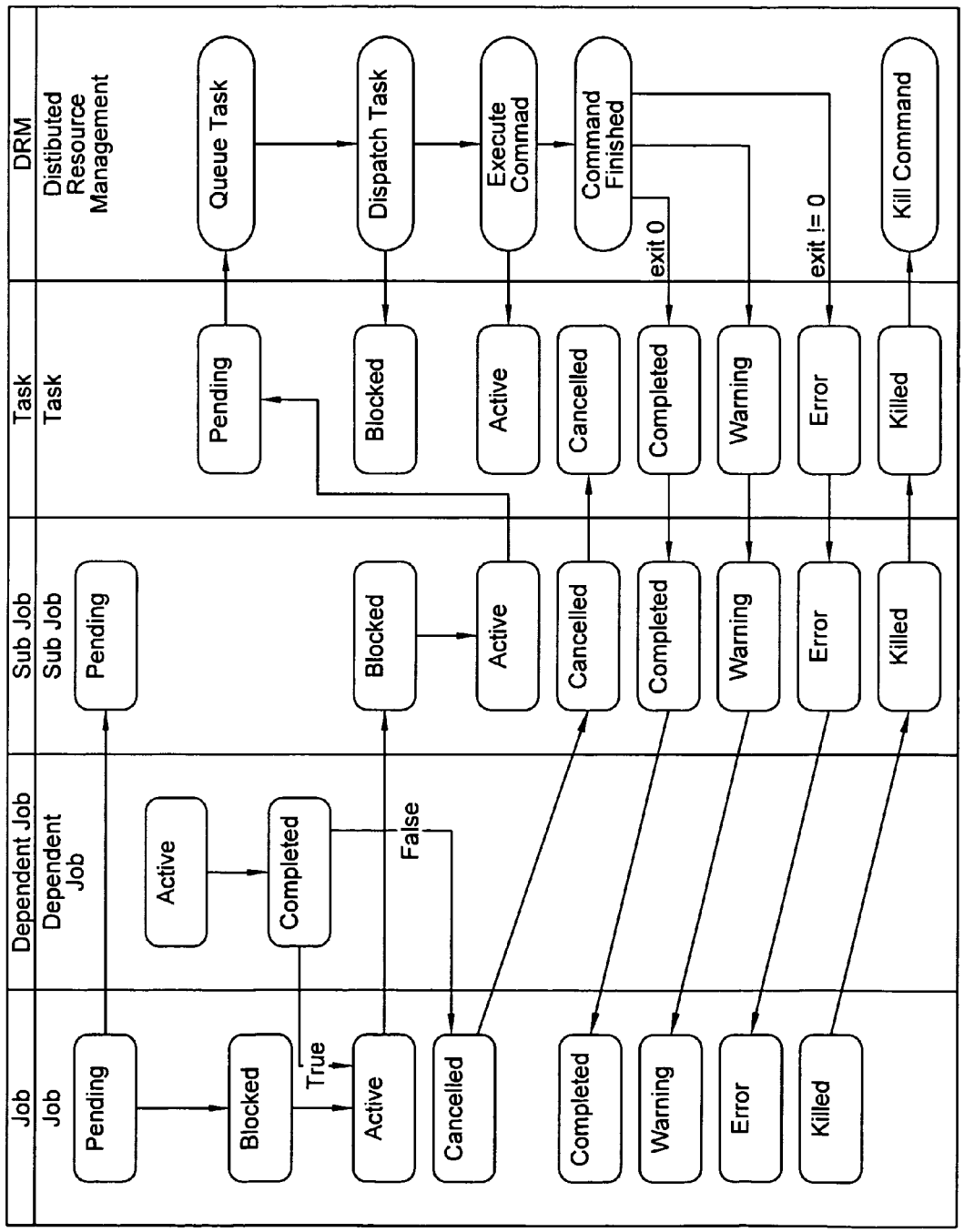
FIG. 4I illustrates how jobs, tasks and a distributed management system of a distributed computing environment interact with each other.

FIG. 4I illustrates how jobs, tasks and the DRM 430 interact with each other. The illustrated example shows how a job with a dependent subjob interacts. More specifically, the job is placed in a pending state by its parent. The job transitions to a Blocked state automatically. The dependent job moves to a completed state from the active state. If the condition on the dependency evaluates to true, the job is moved to an active state. If the condition of the dependency evaluates to false, the job is moved to a cancelled state, which is propagated down to a subjob and the task of the job.

The subjob is moved to a blocked state. The subjob has no dependencies and is moved to an active state automatically. The task is moved to a pending state and is sent to the DRM 430 to be executed. When the task begins execution, the task is marked active. When the task is completed, it can assume one of three states. First, if the exit code is zero, then task assumes a completed state. If the exit code is non-zero, then the state will be an error state. A warning state can be set by a command through a module. The status is passed to the subjob and then up to the job. A job can be killed, and this is propagated down to an individual task. The DRM 430 is notified to kill the command.

Figure 5:
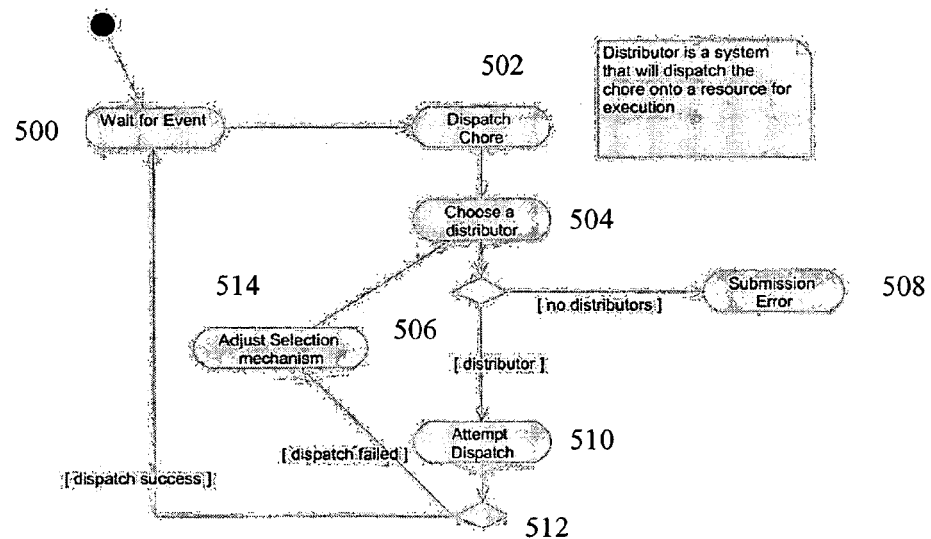
FIG. 5 is a flow diagram illustrating a method for handling multiple heterogeneous dispatch systems according to one embodiment.

Embodiments provide systems and methods for managing various aspects of a distributed computing grid. Referring to FIG. 5, one embodiment is directed to a system and method of handling multiple heterogeneous dispatch systems. In step 500, the system is idle, waiting for an event. From the idle/wait for an event state, the system can receive signal indicating that a chore is to be dispatched. A chore is generally a collection of work, such as individual tasks that are bundled together into chores for distribution or dispatch onto the grid for processing. This specification generally refers to a "chore" for purposes of explanation, not limitation. Thus, the system transitions into a dispatch chore state 502. The task of dispatching a chore 502 can be performed in any known and/or convenient manner using any known and/or convenient mechanism.

From the dispatch chore state, the system can select a distributor in step 504. A distributor is a system that will dispatch the chore onto a resource on the grid for execution. The selection of a distributor can be based on any criteria selected by a user and/or determined by the system. In one embodiment, selection of a distributor can be based on statistical information gathered regarding the distributor. For example, according to one embodiment, the statistical information can be gathered according to the method described in U.S. Provisional Application Ser. No. 60/634,455, filed Dec. 8, 2004, entitled "Method and Apparatus for Gathering Resource Information," and/or Provisional Application No. 60/634,453, filed Dec. 8, 2004, entitled "Method and Apparatus for Propagating Hierarchical. Statistical Data," the contents of both of which are previously incorporated herein by reference.

For example, the mechanism described in this provisional application receives a first set of data from a resource on the grid. Data is gathered into intervals of a first time for a first period. A first statistical model representing the first set of gathered data is generated. A second statistical model is generated based on the first statistical model and represents data in intervals of a second time during a second period. Subsequent statistical models can be generated based on a prior or preceding model, allowing data to be modeled over longer periods of time so that both short term and long term resource trends can be analyzed. In alternate embodiments, any known and/or convenient mechanism for selecting a distributor can be used. Additionally, in still further alternate embodiments, any single factor or combination of factors related to performance and/or capabilities of a distributor can be used to choose a distributor.

In step 506, the system determines whether a distributor that is suitable for the chore and the resources defined in the chore can be located. If the system is unable to locate an appropriate distributor, then in step 508, system can return a submission error message and terminate the chore. If the system locates a suitable distributor, then in step 510, the system can attempt to dispatch the chore to that distributor. In step 512, a determination is made whether dispatch of the chore was successful. If the dispatch of the chore is successful, then the system can return to a state in which it is waiting for another event (step 500). However, if dispatch of the chore fails, then the system can adjust the selection mechanism used to chose the distributor in step 514. Adjustment to the selection mechanism can be effected through any known and/or convenient method and/or mechanism. Additionally, alteration of the selection mechanism can be, in part or in whole, controlled by a predetermined set of user specifiable policies and/or can be controlled, in part or in whole, by a predefined set of policies.

Once the selection mechanism has been adjusted, in step 504, the system can again select a distributor based on the adjusted selection mechanism. The system can iterate through steps 504, 506, 510 and 512 until either a successful dispatch occurs and the system returns to a wait state 500, or until all appropriate distributors have been exhausted and a submission error message is generated in step 508.

Figure 6:
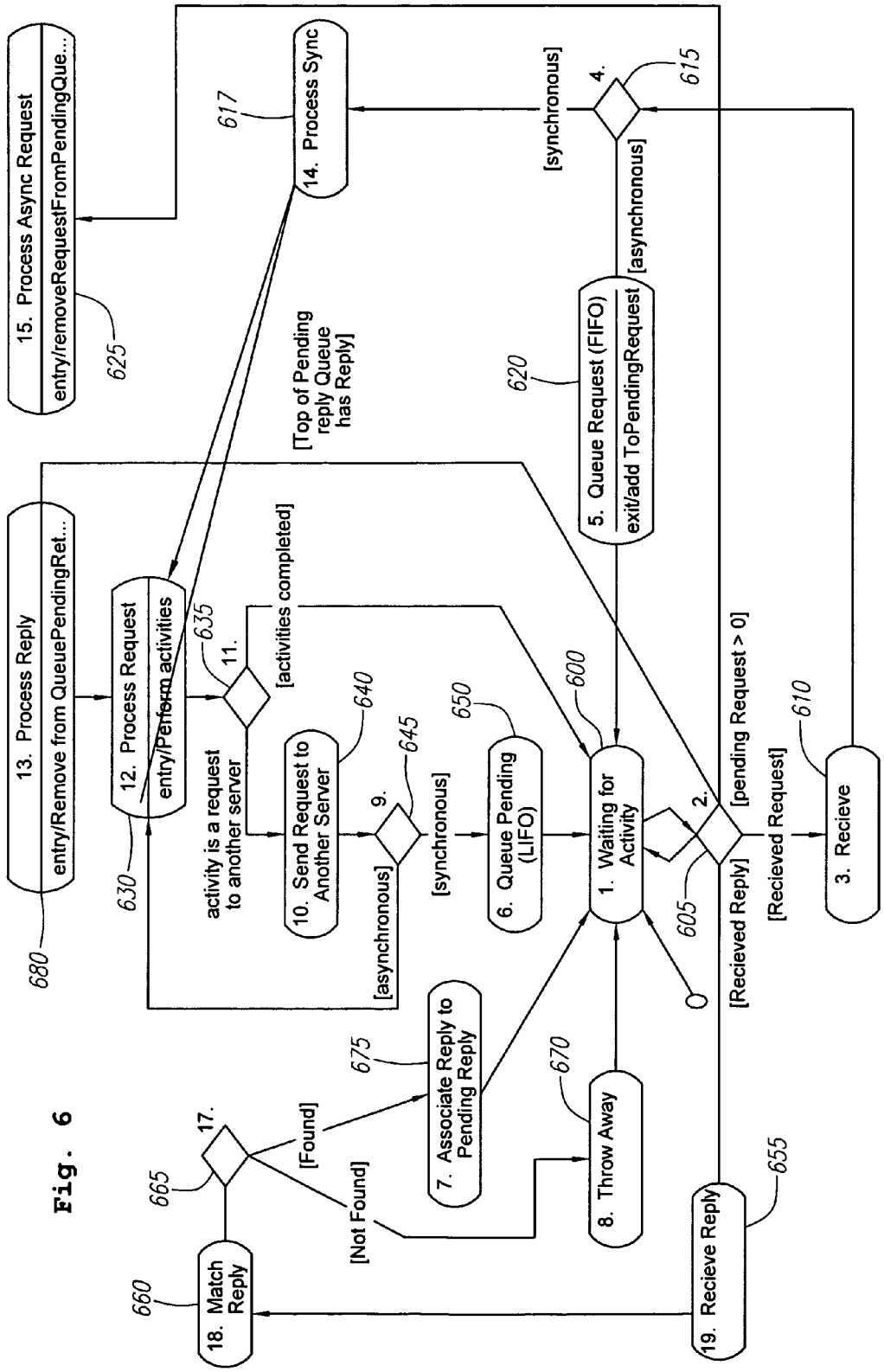
FIG. 6 is a flow diagram illustrating a method of preventing deadlock in single threaded servers according to another embodiment.

Referring to FIG. 6, another embodiment is directed to a method and system for preventing deadlock in single threaded servers. The single threaded server may be in a distributed computing grid.

Beginning with step 600 (1), the state of the system is essentially an idle loop during which the system is "Waiting For Activity." There is a determination or decision point 605 (2) with five paths or transitions, four of which are qualified.

Beginning with, for example, no activities at the decision point 605 (2), and the system receives a request. This is represented as step 610, or "Received Request" (3). In step 615 (4), a determination is made whether the request is synchronous or asynchronous. A synchronous request is, for example, a request elements A, B and C, and the results are received in the same order, A, B and C. An asynchronous request, however, does not depend on a particular order of received data.

If step 615 determines that the request is synchronous, then the synchronous request is processed in step 617 (14) and moves to step 630 (12), process request. If step 615 (4) determines that the request is asynchronous, then in step 620 (5), the system moves to Queue Request or into a First In First Out (FIFO) queue. The request is added to a queue called "Pending Request" as shown in FIG. 6 The Pending Request or Queue Request is primarily for asynchronous requests, and will be handled when the server is idle. These requests are handled in a first-in/first-out fashion.

At that time, the system automatically transitions back to "Wait for Activity" in step 600 (1). After being transitioned to "Wait for Activity," then the system proceeds back down to the decision point 605 (2). If there is a pending request, e.g., represented by Pending Request>0, then the system moves to process an asynchronous request in step 625 (15). The asynchronous request is removed from the pending queue and processed in step 630 (12).

In step 630 (12), there is a history or call stack, in which activities are performed in the order in which they are defined in the definition of the activity. In step 635 (11), there is a determination whether there are any activities that are sent out to another server. If yes, then the system moves to step 640 (10) and sends the request to another server, or "Send Request to Another Server" as shown in FIG. 6. From there, in step 645 (9), there is a determination or decision whether this request is an asynchronous request or a synchronous request. If the request is asynchronous, then the system proceeds to send the request out and returns to "process request" (step 630) (12) in the call stack. If the request is synchronous, then in step 650 (6) system proceeds to send the request out and add it to a pending queue for reply, such as a Last In First Out (LIFO) queue. The Pending Reply queue is used when a server becomes a client and has sent out any request to another server and it is pending a reply from that server. The system them proceeds back to step 600 (1), Wait for Activity. Being in Wait for Activity, the system proceeds down to a determination or decision point in step 605 (2), at which time a reply can be received and the system moves to state or step 655 (19) or "Receive Reply."

From the Receive Reply state, the reply is matched, in step 660 (18) to what has been queued up in the LIFO pending queue for reply. In step 665 (17), there is a determination whether a match has been located. If not, the reply is thrown away in step 670 (8). If so, then in step 675 (7), that reply is associated to a pending reply, and we move back to step 600 (1), Wait for Activity.

When in Wait for Activity, the system proceeds to the decision or determination point in step 605 (2) to look at the top of the pending queue and determine if the top of the pending queue has a reply associated with it. If so, then the system moves from the decision point in step 605 (2) to process the reply in step 680 (13), or "Process Reply" as shown in FIG. 6. The reply that was received is then processed and passed to the call stack. The system moves to Process Request in step 630 (12). In step 635 (11), there is a determination whether all the activities are completed. If so, then the system moves back to step 600 (1), Wait for Activity, and the request is basically completed at that state.

Figure 7:
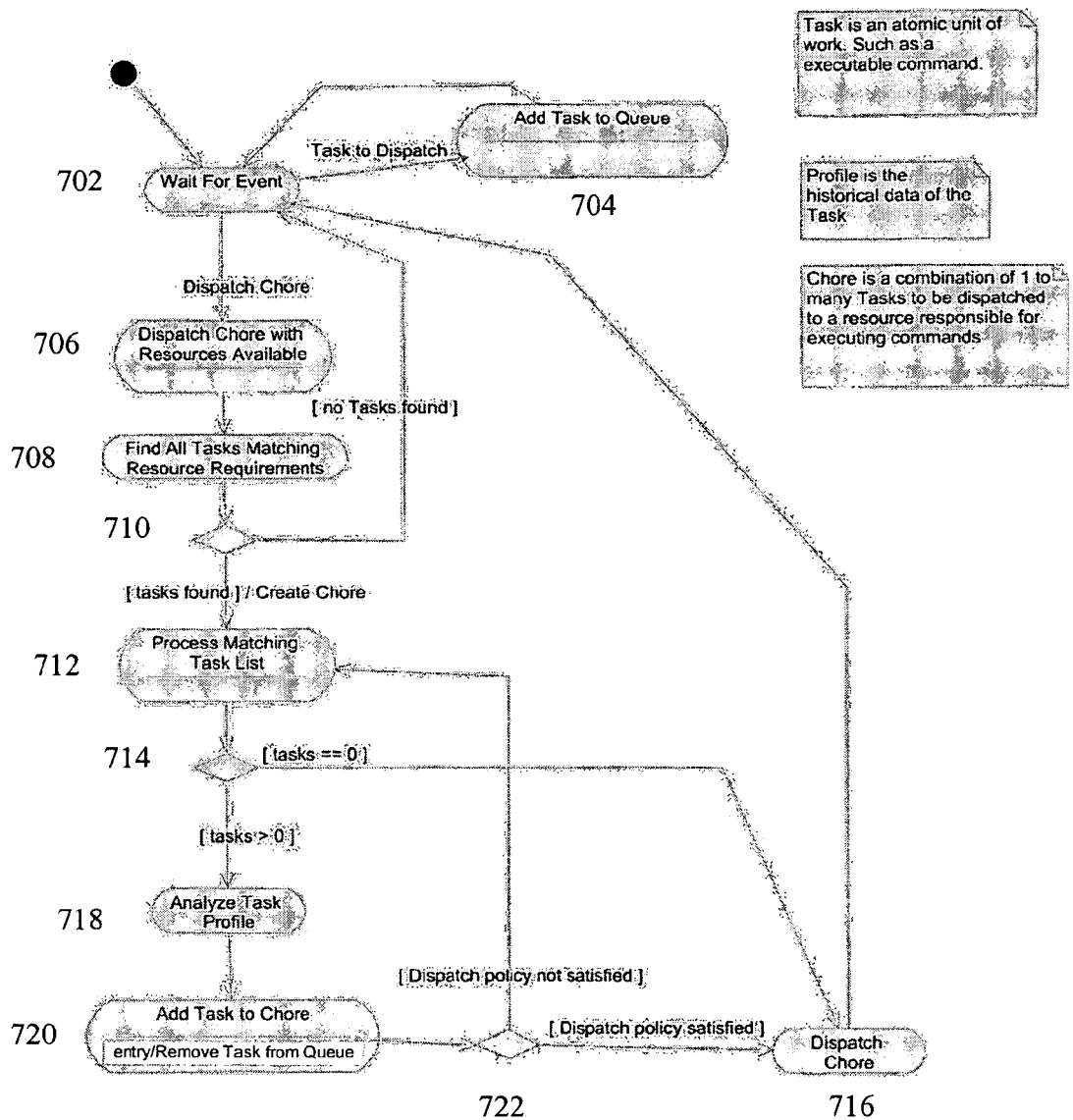
FIG. 7 is a flow diagram illustrating a method of optimizing distributed activities according to a further alternative embodiment.

Referring to FIG. 7, another embodiment is directed to a system and method that can optimize tasks that are contained in a chore to match available resources. This embodiment utilizes the concept of a task, as described above, which is an atomic unit of work, such as an executable process. A chore is a combination of one to many tasks to be dispatched to a resource responsible for executing commands. A profile is the historical data of a task. This data can be any raw or statistical data related to the task, such as average time, standard deviation on processing time of a task, and/or any other known or convenient information regarding the task. In one embodiment, the statistical data can be determined according to the method described in U.S. Provisional Application No. 60/634,453, filed Dec. 8, 2004, entitled "Method and Apparatus for Propagating Hierarchical Statistical Data," the contents of which are incorporated herein by reference. However in alternate embodiments, any other known and/or available data can be used.

In step 702, the system begins in an idle "wait for event loop" state. In this state, the system is watching for two events—a task to dispatch, and a chore to dispatch. If the system receives a task to dispatch, then in step 704, the system adds the task to a queue to be processed later. The system can then return to the "wait for event" in step 702. If the system receives a signal to dispatch a chore, then the system proceeds to a "Dispatch Chore with Resources Available" state in step 706. The dispatch chore signal can be accompanied with resource restrictions determined, for example, by the local system or a resource system. In alternate embodiments, the dispatch chore signal does not include resource limitations.

From step 706, for the dispatch chore with resources available state, the system can find all of the tasks that match requirements of the available resources in step 708. Any convenient and/or known system to perform the matching of tasks to resources can be used.

In step 710, a determination is made whether any such tasks that match resource requirements can be found. If so, then the system creates a chore, and in step 712, the system then can process the matching task list created in step 708. In step 714, a determination is made whether there are any other remaining tasks that match resource requirements. If not, e.g., tasks=0, then there are no remaining tasks to be processed, and in step 716, the chore is dispatched. If there are remaining tasks from step 714 to be processed, e.g., tasks>0, then in step 718, the system can analyze the task profile that is associated with a task, and a task can be added to the chore in step 720. Additionally, once the task is assigned to a chore, the system can remove the task from the task queue that was created in step 704.

In step 722, the system then determines whether the dispatch policy or the chore is satisfied. In one embodiment, the dispatch policy and/or chore policy can be user defined and/or modifiable. However in alternate embodiments, the dispatch policy and/or chore policy can be system defined. If either the dispatch policy and/or the chore policy is not satisfied, then the system proceeds back up to step 712 and processes the next task in the task list. If there are no tasks left in the task list, in step 716, the chore can be dispatched. Any tasks that are remaining I the task list can be processed with steps 712, 714, 716, 718, 720 and 722 as described above.

When the system dispatches a chore in step 716, the system can return to the "wait for event" state in step 202. At this time, the system can receive either another dispatch chore or another task to dispatch, and the process is executed as discussed above.

Figure 8:
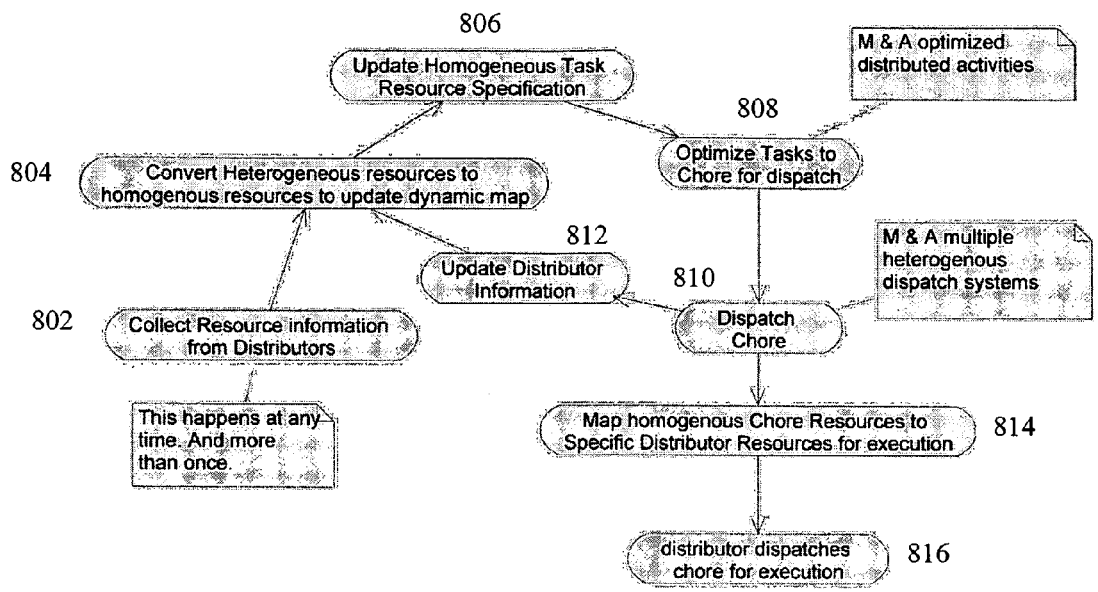
FIG. 8 is a flow diagram illustrating a method for homogeneous identification of heterogeneous resources according to yet a further alternative embodiment.

Referring to FIG. 8, another alternative embodiment is directed to a method of homogenous identification of heterogeneous resources, e.g., within a distributed computing grid. In step 802, resource information is gathered from distributors or other systems that distribute chores to be performed on a computer grid. Resource information can be gathered in any known and/or convenient manner and at any convenient time interval. In one embodiment, resource data can be collected at the same time as statistical or raw information that relates to distributor historical performance, as described in U.S. Provisional Application No. 60/634,455, filed Dec. 8, 2004, entitled "Method and Apparatus for Gathering Resource Information," the contents of which were previously incorporated herein by reference.

After resource information is gathered from distributors in step 802, heterogeneous resource information can be converted into a homogeneous resource map in step 804. This heterogeneous to homogeneous conversion can be performed using any known and/or convenient method of conversion. The converted information can then be used to update or modify a homogeneous task resource specification in step 806.

Tasks can then be assigned to specific chores in step 808 based on a task resource specification, and chores can be dispatched to resources for execution. In one embodiment, the assignment of tasks to chores can use the method described in U.S. Provisional Application Ser. No. 60/634,719, filed Dec. 8, 2004, entitled "Method and Apparatus for Optimizing Distributed Activities", filed on even date herewith, which was previously incorporated herein by reference in its entirety. However in alternate embodiments, assignment of tasks to chores can be performed in any known and/or convenient manner.

In another embodiment, any time a "collect resource information from distributors" 202 is received, the dynamic map can update the tasks that are currently in the task queue after the tasks have been assigned to a chore for dispatch. In an alternate embodiment, the system can also change any tasks that are in a task-pending queue, waiting to be assigned to a chore for dispatch.

Chores can then be dispatched to resources 210 on the grid. In one embodiment, dispatch of chores 210, can be preformed using the method described in U.S. Provisional Application No. 60/634,718, filed Dec. 8, 2004, entitled "Method and Apparatus for Handling Multiple Heterogeneous Dispatch Systems," the contents of which were previously incorporated herein by reference. In alternate embodiments, other known and/or convenient mechanisms can be employed to dispatch chores.

Since the dispatch of a chore actually changes the resource information about the distributors, the system can dynamically update the distributor information in step 812 without having to receive information from the resource. The updated distributor information can then be used to update the dynamic map. Distributor resources are, therefore dynamic, as well as the distributors themselves.

After dispatch of the chore in step 810, the system can map the homogeneous chore resources to specific distributor resources that can process the chore in step 814. That is, the system maps the chore directly to the resources and the commands needed to execute a job. Finally, the distributor can dispatch the chore for execution in step 816.

In one embodiment, simultaneously at the time of dispatch of the chore in step 810, the distributor information can be updated in step 812. In alternate embodiments, dispatching a chore in step 810 and updating distributor information in step 812 can be updated at any convenient times relative to each other.

Figure 9:
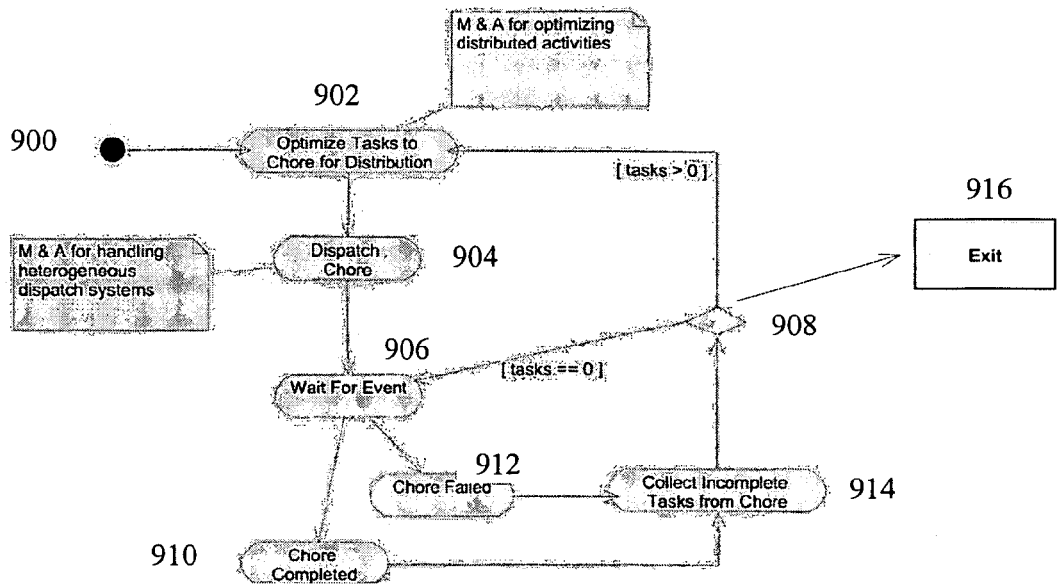
FIG. 9 is a flow chart illustrating a method for automated distribution of failed tasks within a distributed system according to another embodiment.

Referring to FIG. 9, another embodiment is directed to a system and method for automatically distributing failed tasks within a distributed system. The system can incorporate two other mechanisms. One mechanism optimizes distributed activities, as described in U.S. Provisional Application No. 60/634,719, filed Dec. 8, 2004, entitled "Method and Apparatus for Optimizing Distributed Activities," and U.S. Provisional Application No. 60/634,718, filed Dec. 8, 2004, entitled "Method and Apparatus for Handling Multiple Heterogeneous Dispatch Systems," the contents of which were previously incorporated herein by reference. These two mechanisms can be individual states or activities in the state diagram.

In step 902, the system can start by optimizing tasks to a chore for distribution. In one embodiment, this can be performed using the mechanism described in U.S. Provisional Application No. 60/634,719, filed Dec. 8, 2004, entitled "Method and Apparatus for Optimizing Distributed Activities,". In alternate embodiments, task optimization can be performed using any known and or convenient mechanism to assign tasks to a chore.

In step 904, after the system has optimized the tasks, the system can send out or dispatch the chore using a chore mechanism. In one embodiment, the dispatch chore mechanism can be the mechanism described in U.S. Provisional Application No. 60/634,718, filed Dec. 8, 2004, entitled "Method and Apparatus for Handling Multiple Heterogeneous Dispatch Systems,". In alternate embodiments, the dispatch chore mechanism can be any known and/or convenient mechanism that can serve to dispatch a chore for processing.

After dispatching a chore in step 904, the system can proceed to a wait for event state, step 906, during which the system waits for a certain event, e.g., one of two events. One event is completion of a chore in step 910, and the other event is failure of a chore in step 912. In either the chore completion step 910 or the chore failure step 912, the system can collect all of the incomplete tasks within a chore in step 914. Then, in step 908, the system determines how many tasks remain unprocessed. If no tasks remain unprocessed, then the system proceed to an exit state in step 916 where the system can begin processing 900 a new chore when called, as discussed above. Otherwise, if tasks remain unprocessed at step 908, then system can send those uncompleted tasks back to a queue for assignment to a new chore for distribution in step 902. The system can then proceed thorough steps 902, 904, 906, 908, 910, 912 and 914 and proceed back through the loop and down through dispatch chore. In alternate embodiments, the states of chore failed and chore completed from step 906 can be combined into a single state, e.g., chore determination. The chore determination state could feed directly into the collectively complete tasks from chore 914.

One or more or all of the above-described embodiments can be included as components of a scheduler, such as the Alpine Scheduler, developed by Cadence Design Systems, Inc., 2655 Seely Avenue San Jose, Calif. 95134. The Alpine Scheduler is a meta-scheduler that allows users to connect multiple types of schedulers to form the grid, allowing users or organizations to share resources. For example, various schedulers that can be accommodated include, for example, Platform Computing LSF, grid engines of Sun Microsystems, PBS, Globus (available from IBM), Condar (available from University of Wisconsin), Unicore (available from European Grid Community). Thus, the Alpine Scheduler can communicate with all of these schedulers and can communicate with multiple instances of these schedulers.

Embodiments have been described with reference to specific illustrates and descriptions thereof. It will, however, be evident that various modifications and changes may be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. The specification and drawings are, accordingly, to be regarded in an illustrative rather than restrictive sense.

What is claimed:

1. A computer-implemented method for managing multiple heterogeneous dispatch systems in a distributed computing grid having heterogeneous resources, comprising:
   receiving a request to dispatch a chore onto the distributed computing grid having the heterogeneous resources for processing, wherein heterogeneous resource information relating to executions from the heterogeneous resources is gathered, the gathered heterogeneous resource information is converted into homogeneous resource information and the homogeneous resource information modifies one or more selection criteria for choosing a desired distributor to dispatch the chore to the distributed computing grid;
   selecting a first distributor based at least in part upon the one or more selection criteria for choosing the desired distributor;
   attempting to dispatch the chore to the first distributor;
   modifying, by using a processor, the one or more selection criteria for choosing the desired distributor when the chore to the first distributor fails to dispatch,
   selecting a second distributor based at least in part upon the one or more selection criteria for choosing the desired distributor that were modified when the chore failed to be dispatched to the first distributor;
   attempting to dispatch the chore to the second distributor; and
   storing the chore in a volatile or non-volatile computer-usable medium or displaying the chore on a display device.

2. The method of claim 1, further comprising
   dispatching the chore to the second distributor; and
   dispatching the chore onto the distributed computing grid using the second distributor.

3. The method of claim 1, wherein the chore is a combination of one to many tasks to be dispatched to a resource on the distributed computing grid, and a task is executable on a processor of the distributed computing grid.

4. The method of claim 1, wherein the first and second distributors are each configured to dispatch the chore onto the distributed computing grid for processing.

5. The method of claim 1, wherein the selection criteria or modified selection criteria is a statistical model received from a gatherer.

6. The method of claim 5, wherein a distributor is selected based at least in part upon a first statistical model generated by the gatherer, wherein the gatherer performs the steps of
   receiving a first set of data from a resource on the distributed computing grid;
   gathering the first set of data into intervals of a first time for a first period;

generating the first statistical model representing the first set of gathered data in intervals of the first time during the first period.

7. The method of claim 6, wherein a distributor is selected based at least in part upon a second statistical model generated by the gatherer, wherein the method further comprises:
generating the second statistical model based on the first statistical model, wherein the second statistical model represents data in intervals of a second time during a second period.

8. The method of claim 7, wherein the second time is longer than the first time, and the second period is longer than the first period.

9. The method of claim 1, further comprising
terminating the chore if no distributor is selected to dispatch the chore onto the distributed computing grid.

10. The method of claim 1, wherein modifying the selection criteria comprises modifying the selection criteria based at least in part upon a predetermined policy.

11. The method of claim 1, wherein modifying the selection criteria comprises modifying the selection criteria based at least in part upon a user-specified policy.

12. A computer-implemented method for preventing deadlock in single threaded servers of a distributed computing grid having heterogeneous resources, comprising:
dispatching requests over the distributed computing grid having the heterogeneous resources, wherein heterogeneous resource information related to executions from the heterogeneous resources is gathered, the gathered heterogeneous resource information is converted into homogeneous resource information and the homogeneous resource information modifies a resource specification for dispatching the requests to the distributed computing grid;
receiving replies in response to the requests;
storing the replies in a volatile or non-volatile computer-usable medium; and
matching, by using a processor, the requests with the replies, wherein a computer on the distributed computer grid serves as both a client and a server in the same process thread to process the requests and replies, wherein the computer serves as the client to another server, wherein the replies are received out of sequence and the requests are matched with original requests such that the single threaded servers are not deadlocked by the failure to match the requests with the replies when the replies are received out of sequence.

13. The method of claim 12, wherein matching the requests comprises matching the requests to replies in a last in-first out queue.

14. The method of claim 12, further comprising determining whether the request is synchronous or asynchronous.

15. The method of claim 12, wherein the request is asynchronous, further comprising processing the requests using a first in-first out queue.

16. A computer-implemented method for preventing deadlock in single threaded servers of a distributed computing grid having heterogeneous resources, the method comprising:
dispatching asynchronous requests over the distributed computing grid having the heterogeneous resources, wherein heterogeneous resource information related to executions from the heterogeneous resources is gathered, the gathered heterogeneous resource information is converted into homogeneous resource information and the homogeneous resource information modifies a resource specification for dispatching the asynchronous requests to the distributed computing grid;
receiving replies in response to the asynchronous requests;
storing the replies in a volatile or non-volatile computer-usable medium; and
matching, by using a processor, the asynchronous requests with the replies, wherein a computer on the distributed computer grid serves as both a client and a server in the same process thread to process the requests and replies, wherein the replies are received out of sequence and the asynchronous requests are matched with original requests such that the single threaded servers are not deadlocked by the failure to match the asynchronous requests with the replies when the replies are received out of sequence.

17. The method of claim 16, further comprising processing the requests using a first in-first out queue.

18. A computer-implemented method for optimizing distributed activities by matching a chore to available resources on a distributed computing grid having heterogeneous resources, wherein a chore includes one or multiple tasks, and tasks are executable by using one or more processors on the distributed computing grid, comprising:
receiving a first request concerning a resource on the distributed computing grid having the heterogeneous resources;
identifying tasks that match the resource;
combining the identified tasks into a chore;
dispatching the chore onto the distributed computing grid for processing based at least in part upon the resource that has been matched to the tasks of the chore, wherein the tasks of the chores are executed by the one or more processors, wherein the heterogeneous resource information related to executions from the heterogeneous resources is gathered, the gathered heterogeneous resource information is converted into homogeneous resource information and the homogeneous resource information modifies a resource specification for dispatching the chore to the distributed computing grid for execution; and
storing the chore in a volatile or non-volatile computer-usable medium or displaying the chore on a display device.

19. The method of claim 18, wherein tasks are added to a queue, and one or more tasks in the queue that match the resource are identified and included in the chore.

20. The method of claim 18, further comprising removing the identified tasks from a queue after the identified task is assigned to a chore.

21. The method of claim 18, further comprising before the chore is dispatched onto the computing grid, determining whether the chore satisfies a policy.

22. The method of claim 21, wherein the policy is defined by a user.

23. The method of claim 21, wherein the policy can be modified.

24. The method of claim 21, further comprising
determining that the chore does not satisfy the policy;
adding additional tasks that match the resource to the chore to form a modified chore; and
dispatching the modified chore onto the computing grid.

25. The method of claim 21, wherein the policy is satisfied and the chore is dispatched onto the computing grid.

26. A computer-implemented method for homogeneous identification of heterogeneous resources on a distributed computing grid having heterogeneous resources, comprising:
gathering heterogeneous resource information relating to executions from distributors that dispatch chores onto the distributed computing grid having the heterogeneous resources, wherein a chore includes one or multiple tasks, and tasks are executable by using one or more processors on the distributed computing grid;

converting the gathered heterogeneous resource information to homogeneous resource information;

creating a map of available resources based at least in part upon the homogenous resource information;

updating a homogeneous task resource specification using the map;

assigning tasks to a chore based at least in part upon the updated task resource specification;

dispatching the chore onto the distributed computing grid, wherein dispatching the chore changes resource information;

updating the map of available resources to reflect the resource information that was changed resulting from dispatching the chore without having to receive information from the heterogeneous resources; and storing the map in a volatile or non-volatile computer-usable medium or displaying the map on a display device.

27. The method of claim 26, further comprising updating tasks in a task queue after the tasks have been assigned to a chore.

28. The method of claim 26, further comprising changing a task that is waiting to be assigned to a chore.

29. The method of claim 26, updating the map comprising dynamically updating the map without receiving information from a resource.

30. A computer-implemented method for automatically distributing failed tasks within a distributed computing grid having heterogeneous resources, comprising:

dispatching a first chore onto the distributed computing grid having the heterogeneous resources, wherein the first chore includes one or multiple tasks, and tasks are executable by using one or more processors on the distributed computing grid, wherein heterogeneous resource information related to executions from the heterogeneous resources is gathered, the gathered heterogeneous resource information is converted into homogeneous resource information and the homogeneous resource information modifies a resource specification for dispatching the first chore to the distributed computing grid for execution;

determining which tasks within the dispatched first chore were not executed;

assigning the tasks of the first chore that were not executed to a second chore, wherein the tasks that were not executed are a subset of the multiple tasks; and storing the tasks in a volatile or non-volatile computer-usable medium or displaying the tasks on a display device.

31. The method of claim 30, further comprising assigning unexecuted tasks to a queue, and wherein unexecuted tasks are selected from the queue and assigned to the second chore.

32. A computer program product that includes a non-transitory computer readable medium, the non-transitory computer readable medium comprising a plurality of computer instructions which, when executed by a processor, cause the processor to execute performing a process for managing multiple heterogeneous dispatch systems in a distributed computing grid having heterogeneous resources, the process comprising:

receiving a request to dispatch a chore onto the distributed computing grid having the heterogeneous resources for processing, wherein heterogeneous resource information related to executions from the heterogeneous resources is gathered, the gathered heterogeneous resource information is converted into homogeneous resource information and the homogeneous resource information modifies one or more selection criteria for choosing a desired distributor to dispatch the chore to the distributed computing grid for execution;

selecting a first distributor based at least in part upon the one or more selection criteria for choosing the desired distributor;

attempting to dispatch the chore to the first distributor;

modifying the one or more selection criteria for choosing the desired distributor when the chore failed to dispatch to the first distributor;

selecting a second distributor based at least in part upon the one or more selection criteria for choosing the desired distributor that were modified when the chore failed to be dispatched to the first distributor; and attempting to dispatch the chore to the second distributor.

33. The computer program product of claim 32, further comprising dispatching the chore to the second distributor; and dispatching the chore onto the distributed computing grid using the second distributor.

34. The computer program product of claim 32, wherein the chore is a combination of one to many tasks to be dispatched to a resource on the distributed computing grid, and a task is executable on a processor of the distributed computing grid.

35. The computer program product of claim 32, wherein the selection criteria or modified selection criteria is a statistical model received from a gatherer.

36. The computer program product of claim 32, wherein modifying the selection criteria comprises modifying the selection criteria based on a predetermined policy or modifying the selection criteria comprises modifying the selection criteria based on a user-specified policy.

37. A computer program product that includes a non-transitory computer readable medium, the non-transitory computer readable medium comprising a plurality of computer instructions which, when executed by a processor, cause the processor to execute performing a process for preventing deadlock in single threaded servers of a distributed computing grid having heterogeneous resources, the process comprising:

dispatching requests over the distributed computing grid having the heterogeneous resources, wherein heterogeneous resource information related to executions from the heterogeneous resources is gathered, the gathered heterogeneous resource information is converted into homogeneous resource information and the homogeneous resource information modifies a resource specification for dispatching the requests to the distributed computing grid;

receiving replies in response to the requests;

storing the replies; and matching the requests with the replies, wherein a computer on the distributed computer grid serves as both a client and a server in the same process thread to process the requests and replies, wherein the computer serves as the client to another server, wherein the replies are received out of sequence and the requests are matched with original requests such that the single threaded servers are not deadlocked by the failure to match the requests with the replies when the replies are received out of sequence.

38. The computer program product of claim 37, wherein matching the requests comprises matching the requests to replies in a last in-first out queue.

39. The computer program product of claim 37, further comprising determining whether the request is synchronous or asynchronous.

40. A computer program product that includes a non-transitory computer readable medium, the non-transitory computer readable medium comprising a plurality of computer instructions which, when executed by a processor, cause the processor to execute performing a process for preventing deadlock in single threaded servers of a distributed computing grid having heterogeneous resources, the process comprising:
dispatching asynchronous requests over the distributed computing grid having the heterogeneous resources, wherein heterogeneous resource information related to executions from the heterogeneous resources is gathered, the gathered heterogeneous resource information is converted into homogeneous resource information and the homogeneous resource information modifies a resource specification for dispatching the asynchronous requests to the distributed computing grid;
receiving replies in response to the asynchronous requests;
storing the replies; and
matching the asynchronous requests with the replies, wherein a computer on the distributed computer grid serves as both a client and a server in the same process thread to process the requests and replies, wherein the replies are received out of sequence and the asynchronous requests are matched with original requests such that the single threaded servers are not deadlocked by the failure to match the requests with the replies when the replies are received out of sequence.

41. The computer program product of claim 40, further comprising processing the requests using a first in-first out queue.

42. A computer program product that includes a non-transitory computer readable medium, the non-transitory computer readable medium comprising a plurality of computer instructions which, when executed by a processor, cause the processor to execute performing a process for optimizing distributed activities by matching a chore to available resources on a distributed computing grid, wherein a chore includes one or multiple tasks, and tasks are executable on the distributed computing grid having heterogeneous resources, the process comprising:
receiving a first request concerning a resource on the distributed computing grid having the heterogeneous resources;
identifying tasks that match the resource;
combining the identified tasks into a chore; and
dispatching the chore onto the distributed computing grid for processing based at least in part upon the resource that has been matched to the tasks of the chore, wherein heterogeneous resource information related to executions from the heterogeneous resources is gathered, the gathered heterogeneous resource information is converted into homogeneous resource information and the homogeneous resource information modifies one or more selection criteria for choosing a desired distributor to dispatch the chore to the distributed computing grid.

43. The computer program product of claim 42, wherein tasks are added to a queue, and one or more tasks in the queue that match the resource are identified and included in the chore.

44. The computer program product of claim 42, further comprising removing the identified tasks from a queue after the identified task is assigned to a chore.

45. The computer program product of claim 42, further comprising before the chore is dispatched onto the computing grid, determining whether the chore satisfies a policy.

46. A computer program product that includes a non-transitory computer readable medium, the non-transitory computer readable medium comprising a plurality of computer instructions which, when executed by a processor, cause the processor to execute performing a process for homogeneous identification of heterogeneous resources on a distributed computing grid having heterogeneous resources, the process comprising:
gathering heterogeneous resource information relating to executions from distributors that dispatch chores onto the distributed computing grid having the heterogeneous resources, wherein a chore includes one or multiple tasks, and tasks are executable on the distributed computing grid;
converting the gathered heterogeneous resource information to homogeneous resource information;
creating a map of available resources based at least in part upon the homogenous resource information;
updating a homogeneous task resource specification using the map;
assigning tasks to a chore based at least in part upon the updated task resource specification;
dispatching the chore onto the distributed computing grid, wherein dispatching the chore changes resource information; and
updating the map of available resources to reflect the resource information that was changed resulting from dispatching the chore without having to receive information from the heterogeneous resources.

47. The computer program product of claim 46, further comprising updating tasks in a task queue after the tasks have been assigned to a chore.

48. The computer program product of claim 46, further comprising changing a task that is waiting to be assigned to a chore.

49. The computer program product of claim 46, updating the map comprising dynamically updating the map without receiving information from a resource.

50. A computer program product that includes a non-transitory computer readable medium, the non-transitory computer readable medium comprising a plurality of computer instructions which, when executed by a processor, cause the processor to execute performing a process for automatically distributing failed tasks within a distributed computing grid having heterogeneous resources, the process comprising:
dispatching a first chore onto the distributed computing grid, wherein the first chore includes multiple tasks, and tasks are executable on the distributed computing grid having the heterogeneous resources, wherein heterogeneous resource information related to executions from the heterogeneous resources is gathered, the gathered heterogeneous resource information is converted into homogeneous resource information and the homogeneous resource information modifies one or more selection criteria for choosing a desired distributor to dispatch the first chore to the distributed computing grid;
determining which tasks within the dispatched first chore were not executed; and
assigning the tasks of the first chore that were not executed to a second chore, wherein the tasks that were not executed are a subset of the multiple tasks.

51. The computer program product of claim 50, further comprising assigning unexecuted tasks to a queue, and wherein unexecuted tasks are selected from the queue and assigned to the second chore.

52. A system for homogeneous identification of heterogeneous resources on a distributed computing grid having heterogeneous resources, comprising:

a processor for:
- gathering heterogeneous resource information related to executions from distributors that dispatch chores onto the distributed computing grid having the heterogeneous resources, wherein a chore includes one or multiple tasks, and tasks are executable by using one or more processors on the distributed computing grid;
- converting the gathered heterogeneous resource information to homogeneous resource information;
- creating a map of available resources based at least in part upon the homogenous resource information;
- updating a homogeneous task resource specification using the map;
- assigning tasks to a chore based at least in part upon the updated task resource specification;
- dispatching the chore onto the distributed computing grid, wherein dispatching the chore changes resource information;
- updating the map of available resources to reflect the resource information that was changed resulting from dispatching the chore without having to receive information from the heterogeneous resources; and a non-transitory computer-usable medium for storing the map or a display device for displaying the map.

53. The system of claim 52, wherein the processor is further programmed for updating tasks in a task queue after the tasks have been assigned to a chore.

54. The system of claim 52, wherein the processor is further programmed for changing a task that is waiting to be assigned to a chore.

55. The system of claim 52, wherein updating the map comprises dynamically updating the map without receiving information from a resource.

* * * * *